(12) United States Patent
Weber

(10) Patent No.: US 8,253,866 B1
(45) Date of Patent: Aug. 28, 2012

(54) TV REMOTE CONTROL ENABLES SIMPLIFIED CHANNEL-SELECTION

(76) Inventor: Harold J. Weber, Centerville, MA (US)

( * ) Notice: Subject to any disclaimer, the term of this patent is extended or adjusted under 35 U.S.C. 154(b) by 1242 days.

(21) Appl. No.: 12/001,022

(22) Filed: Dec. 10, 2007

(51) Int. Cl.
H04N 5/44 (2011.01)
(52) U.S. Cl. .......................................... 348/734; 725/133
(58) Field of Classification Search .................. 348/734; 725/133, 141, 153
See application file for complete search history.

(56) References Cited

U.S. PATENT DOCUMENTS

| | | | |
|---|---|---|---|
| 3,968,443 A | 7/1976 | Leuschner | 325/455 |
| 4,031,474 A | 6/1977 | Ehni, III et al. | 325/455 |
| 4,045,777 A | 8/1977 | Mierzwinski et al. | 340/168 |
| 5,436,676 A * | 7/1995 | Pint et al. | 348/734 |
| 6,094,239 A * | 7/2000 | Weber | 348/734 |
| 6,127,961 A | 10/2000 | Stacy et al. | 341/176 |
| 6,278,499 B1 * | 8/2001 | Darbee et al. | 348/734 |
| 6,484,011 B1 * | 11/2002 | Thompson et al. | 455/3.06 |
| 6,636,273 B1 * | 10/2003 | Weber | 348/734 |
| 6,757,001 B2 * | 6/2004 | Allport | 715/840 |
| 6,766,526 B1 * | 7/2004 | Ellis | 725/57 |
| 7,340,763 B1 * | 3/2008 | Harris | 725/81 |
| 7,388,536 B2 * | 6/2008 | Kim | 341/176 |
| 2004/0172648 A1 * | 9/2004 | Xu et al. | 725/38 |
| 2005/0212979 A1 * | 9/2005 | Morita et al. | 348/734 |
| 2007/0205909 A1 * | 9/2007 | Kung | 340/825.22 |
| 2009/0244402 A1 * | 10/2009 | Rye et al. | 348/734 |

* cited by examiner

Primary Examiner — Annan Shang

(57) ABSTRACT

A hand-held universal remote control enabling a user to jump directly to a desired channel and adjust sound level of a conventional remotely-controllable television receiver. A minimum number of key-buttons reduces operator confusion, particularly for elderly and physically challenged persons. A desired channel number is incrementally entered by actuation of a single key-button that advances a viewable display to any channel between 01 and 99. Once the desired channel number appears on the display a SEND button is pressed and the desired channel number change is commanded to the television receiver. A provision enabling entry of 3-digit channels between 001 and 999 is discussed. Inclusion of at least one additional key-button controls sound volume level and mute. The SEND key may also command power on/off. A complement of as few as three keybuttons may implement all of the essential features.

20 Claims, 18 Drawing Sheets

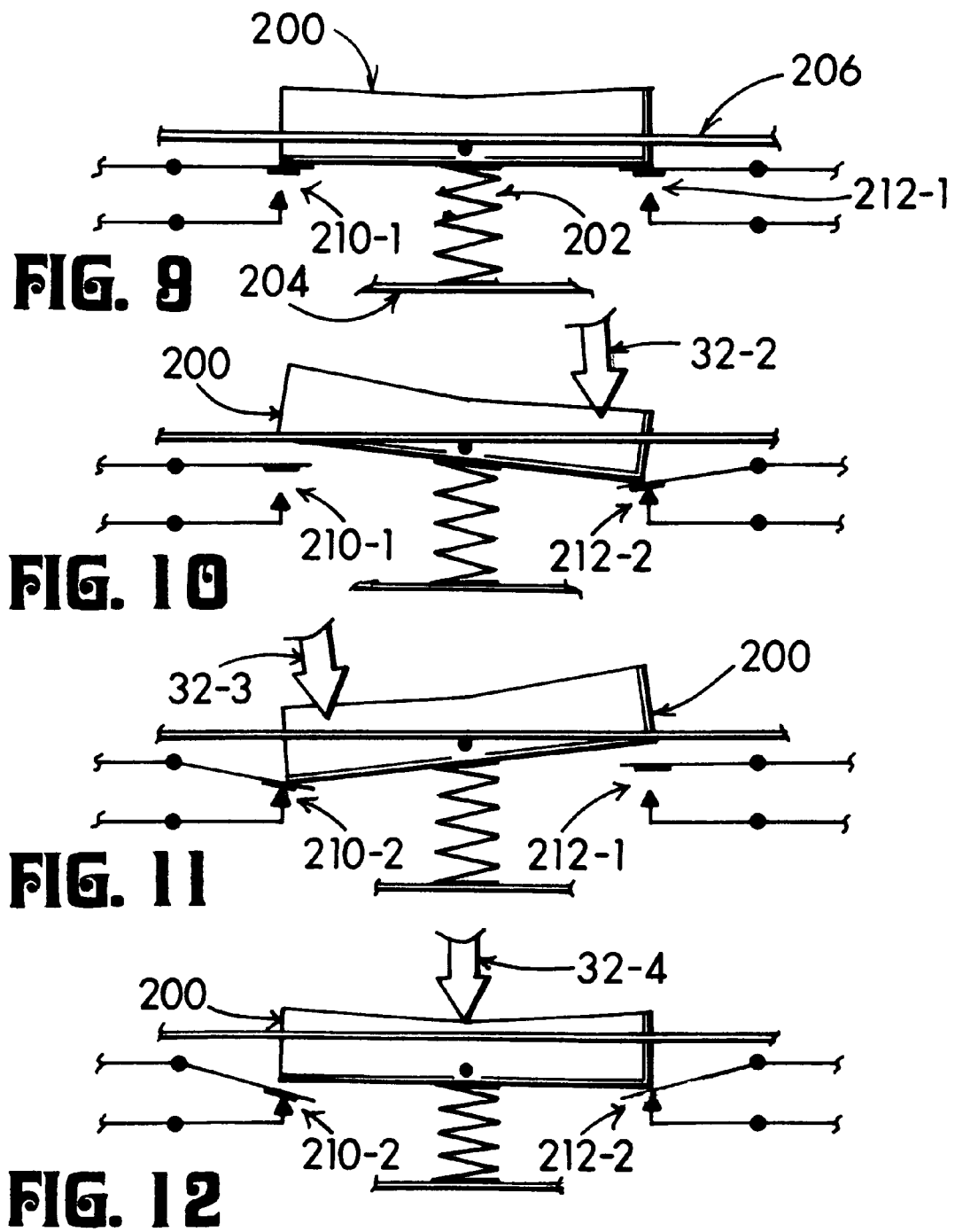

TV Channel Guide

Excerpted in part from
Cape Cod Times *(Newspaper)*
21 October 2007

| Real Channel | Station Name | Comcast Channel | Real Channel | Station Name | Comcast Channel |
|---|---|---|---|---|---|
| 2 | WGBH-PBS | 2 | FX | FX Network | 30 |
| 4 | WBZ-CBS | 4 | GOLF | Golf Channel | 53 |
| 5 | WCVB-ABC | 5 | HALL | Hallmark | 21 |
| 6 | WLNE-ABC | 6 | HBO | Home Box Office | 301 |
| 7 | WHDH-NBC | 7 | HBOF | HBO Family | 304 |
| 10 | WJAR-NBC | 10 | HBOP | HBO Plus | 302 |
| 12 | WPRI-CBS | 12 | HBOS | HBO Signature | 303 |
| 25 | WFXT-FOX | 13 | HGTV | Home & Garden | 32 |
| 36 | WSBE-PBS | 20 | HIST | History Channel | 58 |
| 38 | WSBK-IND | 14 | HN | Headline News | 43 |
| 44 | WGBX-PBS | 16 | LIFE | Lifetime TV | 36 |
| 56 | WLVI-CW | 11 | MAX | Cinemax | 341 |
| 66 | WUTF-IND | 67 | MSNBC | Microsoft NBC | 40 |
| 68 | WBPX-ION | 15 | MTV | Music Television | 28 |
| AMC | Am.Movie Classics | 59 | NGEO | Nat. Geographic | 211 |
| AP | Animal Planet | 63 | NICK | Nickelodeon | 51 |
| ARTS | Arts & Entertain. | 37 | OXY | Oxygen Channel | 216 |
| BBCA | BBC America | 241 | SCIFI | Science Fiction | 62 |
| BET | Black Ent. TV | 21 | SHOW | Showtime Channel | 361 |
| BRAVO | Bravo Movies | 57 | SPEED | Speed Channel | 250 |
| CMT | Country Music | 66 | SPIKE | Spike TV | 55 |
| CN8 | Comcast Network | 3 | STARZ | Starz TV | 321 |
| CNBC | Consumer News | 46 | SUND | Sundance TV | 201 |
| CNN | Cable News Net. | 42 | TBS | Turner Broadcast | 31 |
| COM | Comedy Channel | 61 | TCM | Turner Classics | 213 |
| COURT | Court TV | 27 | TLC | Learning Channel | 38 |
| CSPAN | House of Reps. | 44 | TMC | The Movie Chan'l | 381 |
| CSPAN2 | House of Reps.-2 | 45 | TNT | Turner Network TV | 33 |
| DIS | Disney Channel | 24 | TOON | Cartoon Network | 60 |
| DISC | Discovery Channel | 39 | TRAV | Travel Channel | 54 |
| E | E! Entertainment | 34 | TVL | TV Land | 64 |
| ENC | Encore | 326 | TWC | Weather Channel | 47 |
| EWTN | Eternal Word Net. | 56 | USA | USA Network | 35 |
| FAM | ABC Family | 26 | VS | Versus | 65 |
| FNC | Fox News Channel | 41 | VH1 | Video Hits 1 | 29 |
|  |  |  | WE | Women's Entertain. | 215 |

FIG. 22

TV REMOTE CONTROL ENABLES SIMPLIFIED CHANNEL-SELECTION

FIELD OF INVENTION

This invention pertains to a portable hand-held remote control generally utilizing as few as one keyboard button to achieve direct channel selection on a television viewing system viz "televisor." More particularly it describes a compact remote controller having a capability for selecting a specific channel number without a use of a numerical keypad. Moreover it enables a direct numerical jump between widely spaced channels without "stepping-through" any intervenient channels.

Synopsis

In the invention's operating scenario, a user may manually enter and visually display a numerical value for a desired channel selection and jump directly to the selected channel while utilizing a keypad having, in it's most fundamental essence, as few as one channel selection button. A channel selection is "stepped" by pressing and maintaining actuation of the selection button to achieve an incremental advance of one or more numeric digits rendered on the visual display until the desired channel number is reached, whereupon a "SEND" button is actuated and the presently displayed channel selection is sent to the televisor.

Take for example an illustrative intent to tune the TV receiver to "Channel 274". Initially, the display is preset by default to "000". In this unique remote control the channel selection key-button is pressed and maintained as pressed until a display of the desired channel number "274" appears. When the display satisfactorily shows the numeric value "274", the SEND command is entered that dispatches the encoded wireless signal sequence to the televisor by wireless transmission to effectuate whatever channel it is presently tuned to jump to channel "274".

The SEND key-button may be a mere quick-press of the designated SEND key-button. The SEND key-button function may also be combined with and shared by the POWER on/off function. By briefly pressing a combination "SEND/POWER" button during a time window period of less than about two seconds, the "send" command function may be effectuated when the key is released prior to elapse of the time window. Furthermore, the same button may command sending the televisor's power "ON/OFF" function by merely pressing and maintaining the actuation of the button beyond the mentioned time window period whereupon the power command sends upon the release of the key.

In it's preferred embodiment, the remote control has 2 key-buttons, namely: "SEND/POWER" and "CHANNEL-SET". To adjust sound level, two more key-buttons or one combination rocker-style key-button is included to increment "VOLUME-UP" and "VOLUME-DOWN" as either one end or the other is pressed. Configured as such, the remote control sports a total of merely three or four key-buttons to accomplish all the essential commands for controlling channel number selection, volume and mute control, as well as power ON and OFF. In other words, the "MUTE" function is satisfied, without the complexity of adding another button by utilizing this unique duplex manipulation of the volume-adjusting key-button.

BACKGROUND OVERVIEW

This invention affords a novel level of convenience and utter simplicity over other known remote controls. Yes, there are other "few button" and "simplified" remote controls known in the art. Although somewhat easier to use than the prior art of multi-buttoned controls they intend to outmode, these earlier offerings deny the user the ability to actually select and jump directly to a specific channel number from a roster of dozens if not hundreds of available channels. For the most part, the prior devices such as a TekPal™—Universal Large Button TV Remote, Model BW2007 (Hy-Tek Mfg. Co., Inc., 1998 Bucktail Lane, Sugar Grove, Ill. 60554) offer simple and easy control of a televisor with as few as 6 buttons. For example, the TekPal™ provides power on/off, mute, channel up/down and volume up/down key-buttons. This is a prior art example of a TV remote that claims that it "does what you need with your televisor."

A serious shortfall of "simple" remote controls of this ilk is an absolute inability to specifically select a channel number before commanding the televisor to make a change to the desired program channel. Simple remote controls presently known in the art do not produce a direct jump to a desired channel but instead they must be stepped through all the intervenient channels that may lay between a presently viewed channel and the desired channel. For example, if the user is watching a program on channel 7 and subsequently wishes to watch a program next on channel 69, the televisor must annoyingly be stepped-through all 61 channels laying between channel 7 and channel 69.

This invention addresses a known lacking in the art by teaching a really-simple remote control having as few as three manual key-buttons that may command an immediate change (or "jump") from a presently viewed channel 7 to the desired channel 69 without "clicking through" many in-between channels.

BENEFITS OF INVENTION

A central goal and hence a main benefit of this invention is to enable an ordinary user to directly jump to a numerically far-removed albeit next-desired channel selection on a televisor with a remote control that has as few as one or two keys. Beyond that the remote control as presently taught is far less confusing to use than what the prior art generally offers. Elderly and physically challenged persons are obvious benefactors of the invention's utter simplicity. Exceptionally few essential keys, combined with an ability to designate and jump directly to the next channel without the annoyance of having to step through all the intervenient channels establishes this invention to be far ahead of other "simple remotes" that are presently known in the available art.

Eliminating the plethora of seldom-used buttons found on conventional remote controls while retaining an ability to switch directly from a current channel number selection as a single jump to a far-removed channel number selection is a novel advantage of this invention. Although the key-button count is greatly reduced over conventional art, the invention's essence maintains a convenient capability for directly picking and jumping to the next desired channel as well as providing volume up/down adjustment, mute and power on/off commands.

PROBLEMS SOLVED BY INVENTION

A unique aspect of this invention is to provide a full-featured capability for directly jumping from a present channel to a next desired channel selection, setting volume level, muting and power control of a televisor while using a remote control have as few as two user actuated key-buttons. Previously known simple remote controls, such as a 6-button remote control marketed by Magnavox™ appears to be simple to use, when merely changing between nearly adjacent channels. For example, a change from channel 4 to channel 7 is readily accomplished by merely "clicking-through" channels 5 and 6. In fact this worked pretty well with "over the air" television broadcasting, with closely spaced channel numbers.

Contemporary cable and satellite television distribution tends towards a wider spread of channel numbers. It is soon realized that when using these prior-art remote controls, a more substantial channel change becomes far more difficult. For example, to change from viewing channel 5 to viewing channel 57 means a channel-by-channel "clicking-through" all 51 intervenient channels. At best this is time-consuming and more often generally found to be an unrealistic burden causing many frustrated viewers to skip changing to channels that they would really like to watch.

This invention offers a solution to the current problem associated with the known limitations of existing "minimal-feature" remote controls by including a provision for directly jumping from a present channel to a numerically far-removed channel while skipping-over all of the in-between channels. Customary "convenience controls" are retained, including: volume up/down, mute and power on/off. All of these convenience functions are efficiently embraced with a physical presence of as few as three key buttons.

SUMMARY OF INVENTION

A user of a typical universal or proprietary remote controller is often exasperated by the number of seldom-used "buttons" crowding the remote control's keypad. Elderly and physically challenged persons are known to have difficulty in operating the essential keys due to the tight spacing and small size of a clutter of the seldom used keys. As a result, making individual entries becomes extremely difficult. Even for an average user, many of the keys provided in the plethora of keys on an ordinary remote control are seldom needed and tend to confuse entries, especially in dim lighting. This invention eliminates of all but the most basic function keys. This simplification particularly benefits senior citizens as well as users of any age who experience physical or mental handicap issues.

An overview of the prior art brings forth a limited number of "simple" remote controls offering a basic simplicity of as few as six keys for channel-up/down, volume-up/down, mute and power-on/off. A substantial shortfall of these prior remote controls and a practical reason for their not achieving a more widespread usage acceptance is their inherent incapability to conveniently enable the user to specify and directly jump-to the "next channel". The known "simple remote" ordinarily requires that the viewer advances through every channel that may lay between a present channel setting and a next desired channel selection. The inconvenience of switching through every intervenient channel can be very time-consuming, sometimes causing a viewer to miss seeing the opening sequence of a next desired channel's program content.

This invention overcomes these prior art shortfalls including the typical "click-click-click" stepping of channels as the televisor proceeds to flash through an annoying succession of images as it clatters towards the desired channel. This invention describes a novel capability for enabling the user to choose and visually display a desired channel number on the remote control before actually commanding the televisor to make a channel and program change.

Mode 1 Example

Only one key is necessary to advance a two-digit channel number from 01 to a desired maximum channel selection value of 99. Holding the CHANNEL-ENTRY key down allows the numeric value to incrementally increase (i.e., step) through the available channel numbers. Once the desired channel number is reached, the SEND key is pressed and the "selected channel" number command is sent to the televisor enabling it to promptly jump-to the new channel without stepping through every intervenient channel. The sending event also resets the displayed two-digit channel value to a usually 00 default value.

Mode 2 Example

Retains the offering of Mode 1 and decreases wait time for attaining the display of the higher channel numbers by providing an acceleration of tens-position numerical count advance when the CHANNEL-SELECT key is pressed and held. Once the desired channel number is reached the SEND key is pressed and the "selected channel" change command is sent to the televisor, enabling it to promptly jump-to the new channel without stepping through every intervenient channel. The sending event also resets the displayed two-digit channel value to a usually 00 default value.

Mode 3 Example

Only one key is necessary to advance a three-digit channel number from 001 (or 1) to a desired maximum channel selection value of 999. Holding the CHANNEL-ENTRY key down allows the numeric value to incrementally increase (i.e., step) through the available channel numbers. Once the desired channel number is reached the SEND key is pressed and the "selected channel" change command is sent to the televisor, enabling it to promptly jump-to the new channel without stepping through every intervenient channel. The sending event also resets the displayed two-digit channel value to a usually 000 default value.

Mode 4 Example

Retains the offering of Mode 3 to further provide an acceleration of tens-position and hundreds-position numerical advance when the CHANNEL-SELECT key is pressed and maintained to decrease the wait time for attaining the display of the higher channel numbers. Once the desired channel number is reached the SEND key is pressed and the "selected channel" change command is sent to the televisor and the displayed two-digit channel value to a usually 000 default value.

Mode 5 Example

Retains the offering of Mode 1 or Mode 3 with a further inclusion of a triad of keys including a VOLUME-UP, VOLUME-DOWN and MUTE that may be actuated by the user to send correspondent commands to the televisor.

Mode 6 Example

Retains the offering of Mode 1 or Mode 3 with the SEND key serving a role as also a POWER control key. Briefly pressing the SEND key signals a sending of the desired channel number selection to the televisor, while a maintained actuation of the SEND key beyond a predetermined typical 2 second time interval signals for a POWER command being sent that turns an initially-OFF televisor ON, or else turns a presently-ON televisor OFF.

Mode 7 Example

Retains the offering of Mode 1 or Mode 3 with the inclusion of a pair of key-buttons providing a volume-up (V+) and volume-down (V−) key that may be individually actuated by the user to send correspondent volume level commands to the televisor. A concurrent pressing of both the volume-up and volume-down keys is furthermore a signal for sending a MUTE command to the televisor to quiet (or un-quiet) the sound. As a filter against accidental mute actuation, the concurrent key press recognition is intentionally delayed for about a second.

Mode 8 Example

Retains the offering of Mode 1 or Mode 3 with a further inclusion of an elongated and preferably rocker-style of key-button providing a VOLUME-UP (V+) signal when a first-end is actuated and a VOLUME-DOWN (V−) signal when a second-end is actuated. A simultaneous pressing of both ends or pressing the center of the volume setting key-button is consubstantiated for sending a MUTE command to the televisor to quiet (or else un-quiet) the sound. As a filter against accidental mute actuation the recognition of the concurrent key press is intentionally delayed for about a second.

Mode 9 Example

The teaching of Mode 1 or 3 where the CHANNEL-ENTRY key is configured as a usually elongated "rocker" or "toggle" style entry key. Maintaining actuation in a first direction induces channel incrementation up-count whilst maintaining actuation in a second direction induces channel incrementation down-count. This bidirectional counting enables an over-count display to be stepped back to a desired value before sending.

What this Invention "is" and "is-not"

Clearly this invention "is not" about producing channel change of a televisor's tuning by merely stepping-through each channel intervenient of a present channel and a desired channel.

The invention "is not" about conventionally providing a keypad having multiple keys for separate entry of a channel number digits.

Furthermore, the invention "is not" about a remote control having capability for selecting only a limited number of pre-designated channels with preprogrammed or preset keys.

The invention "is" about a method for advancing a remote control's local display to a desired channel number before actually sending the channel selection command to the televisor.

Know that the invention includes a SEND key for commuting the displayed channel number to the televisor when the displayed numeric value advances to match the desired channel number.

Realize that the invention "is" about a method for providing selection of all the available channel combinations usually between 01 and 99 and extensible to any channel number between 001 and 999 with the use of only one CHANNEL-ENTRY key.

Know that the invention "is" about duplexing the channel entry key actuation in a manner recognizable as a POWER control command.

Find also that the invention "is" about duplexing operation of the volume adjustment key in a manner recognizable as a MUTE control command.

Additionally the invention "is" about duplexing the SEND key-button to be recognizable as a POWER control command when actuation is maintained beyond a typical 2 second time interval.

Lastly, the invention "is" about a method for providing a remote control particularly suitable for elderly and physically challenged persons by utilizing a minimum number of keys while retaining a full complement of basic control functions, including an ability for selecting a different channel number without necessarily stepping" the televisor through a plurality of intervenient channels.

OBJECTIVES OF INVENTION

An objective of the invention is to provide a simple remote control.

A purpose of the invention is to allow a channel change to any available multi-digit channel number by merely pressing and holding-down the CHANNEL-ENTRY key-button until the desired channel number is displayed, followed by the actuation of the SEND key.

A gist of the invention is to SEND a change of channels directly, with a single jump from a present channel number to a significantly different numbered channel preference without a necessity for stepping through a plurality of intervenient channels.

A key purpose for the invention is to reduce the channel-selection key count on a remote control to as few as one CHANNEL-ENTRY key and a SEND key without compromising an ability for directly selecting the next channel choice.

The spirit of the invention is to eliminate the crowded array of seldom-used keys typical of ordinary remote control keypads.

A further goal for the invention is to provide for an adjustment of volume level and mute functions by merely two keys.

Yet another intent for the invention is to duplex the SEND key as a POWER command function.

Still another object of the invention is to duplex the volume level adjustment keys as a MUTE command function.

It is an important intent to provide all these and other features in an economic apparatus capable of universal application with a majority of commercially available televisors.

DESCRIPTION OF DRAWINGS

The invention is depicted by 18 sheets of drawings showing 22 figures, including:

FIGS. 9-12—A "rocker" switch applicable to channel change and volume functions.

FIG. 22—A typical TV Channel Guide showing relationship between station/network identifications and channel numbers.

DESCRIPTION OF INVENTION

Figure 1:
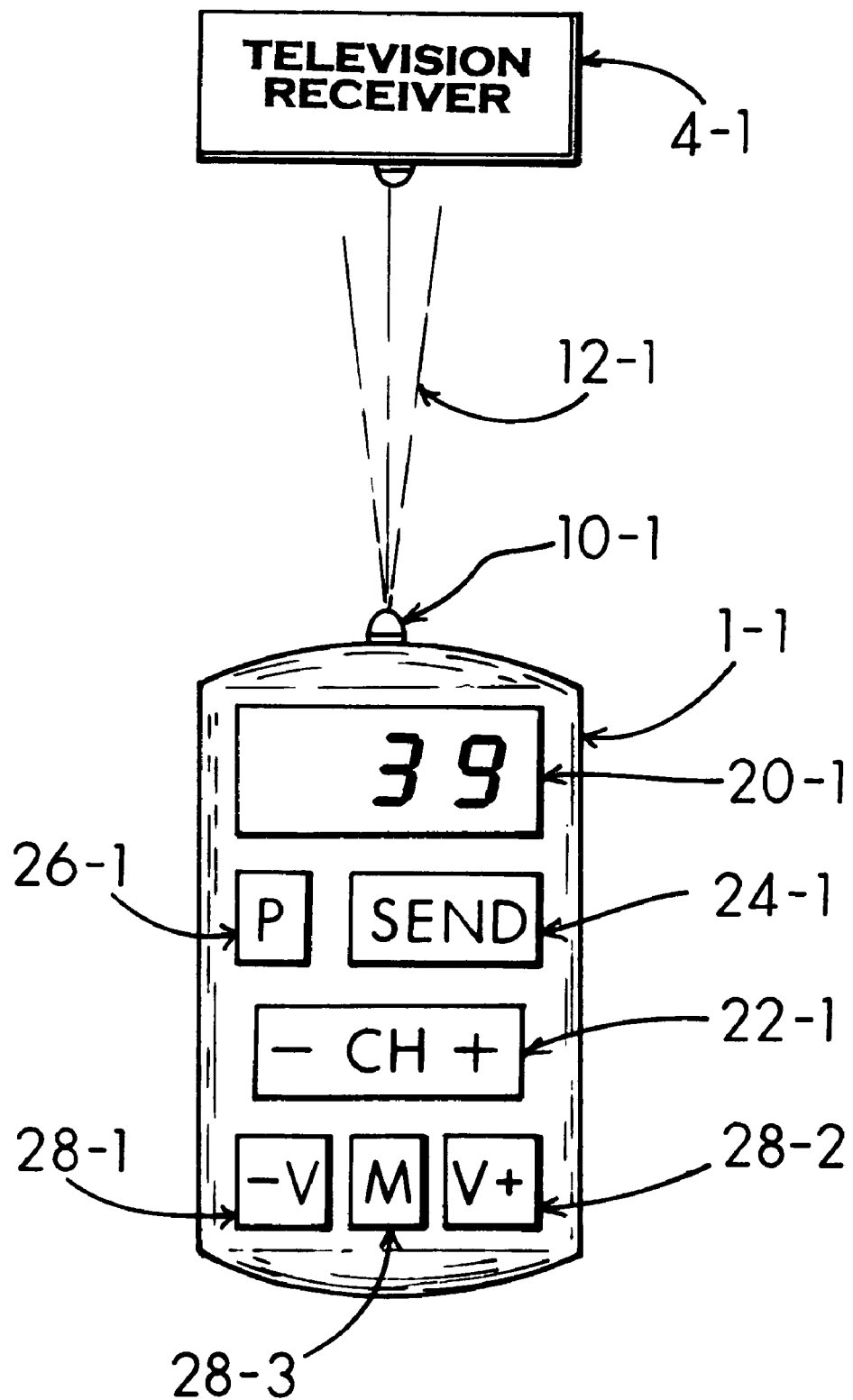
FIG. 1—An overview of a portable remote controller having a display and six key-buttons commanding a televisor.

A structure suitable for the hand-held remote controller appears in FIG. 1 to include a LED 10-1 for sending a wireless light beam 12-1 to a controlled television receiver viz televisor 4-1. An encoded command signal emits 12-1 from the LED 10-1 and impinges on a receptor intrinsic with the televisor 4-1. The command signal is decoded to command channel change and volume control functions in the televisor 4-1.

The remote controller 1-1 supports a LCD or similar numeric display 20-1 capable of presenting at least two channel number digits, such as the representatively shown channel "39". A user operable keypad includes a CHANNEL+/– (up/down) key-button 22-1; a SEND key 24-1, a POWER key 26-1 as well as two VOLUME adjust keys 28-1, 28-2 and a MUTE key 28-3. In a usual operating scenario the display 20-1 displays a default value "00". The user presses the CH+ key to automatically increment the displayed count 20-1 up to, as representatively show, a numerical value 39. At this point the SEND key 24-1 is pressed by the user and a command signal emanates from the LED 10-1, sending a wireless command signal 12-1 to the televisor 4-1. As a usual result, the televisor re-tunes to channel 39. When the SEND function completes, the display 20-1 defaults back to a "00" value while awaiting the next selection entry.

Figure 2:
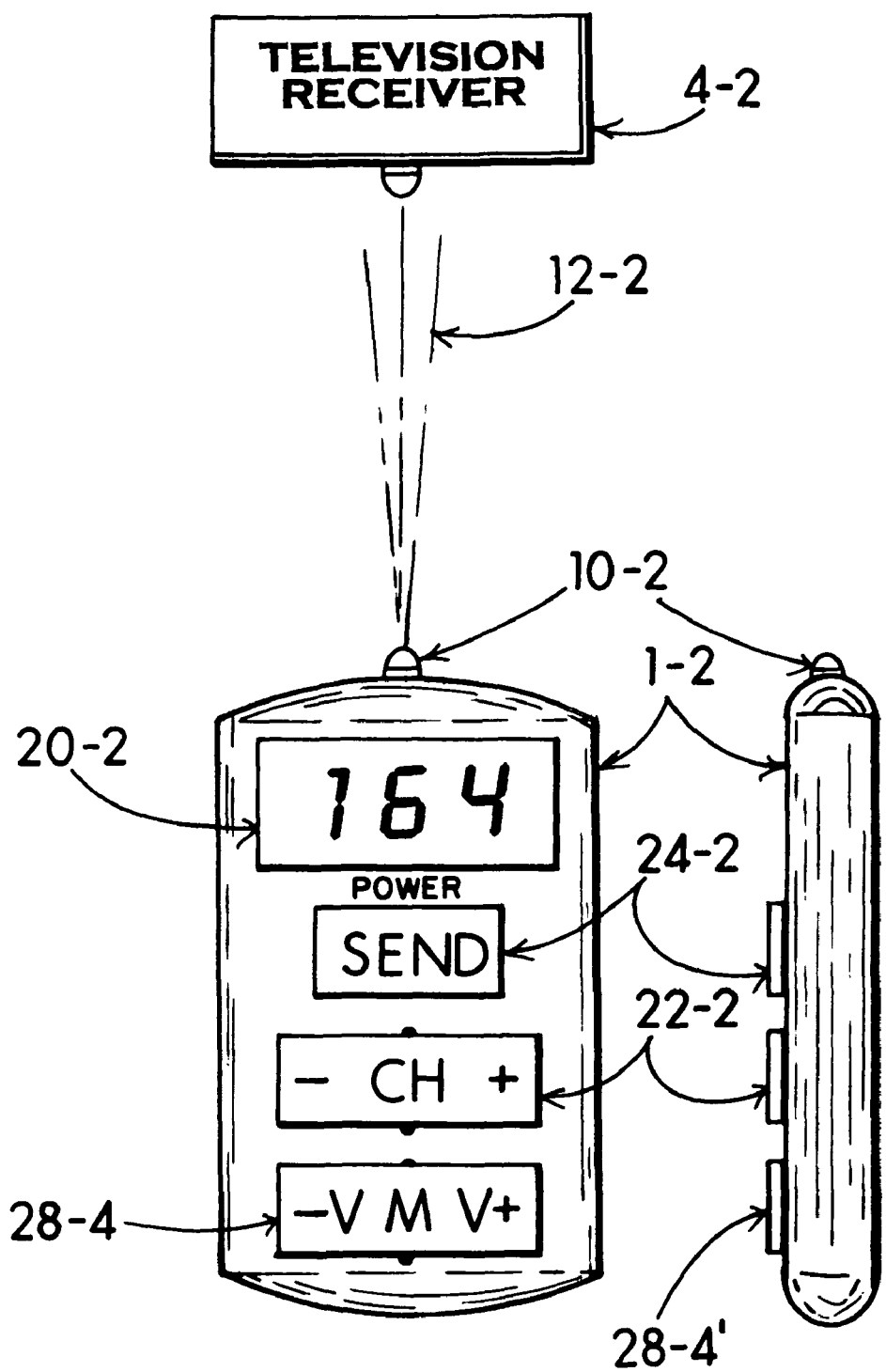
FIG. 2—An physical embodiment of the portable remote controller having a display and merely three key-buttons producing wireless command of the televisor.
Figure 4:
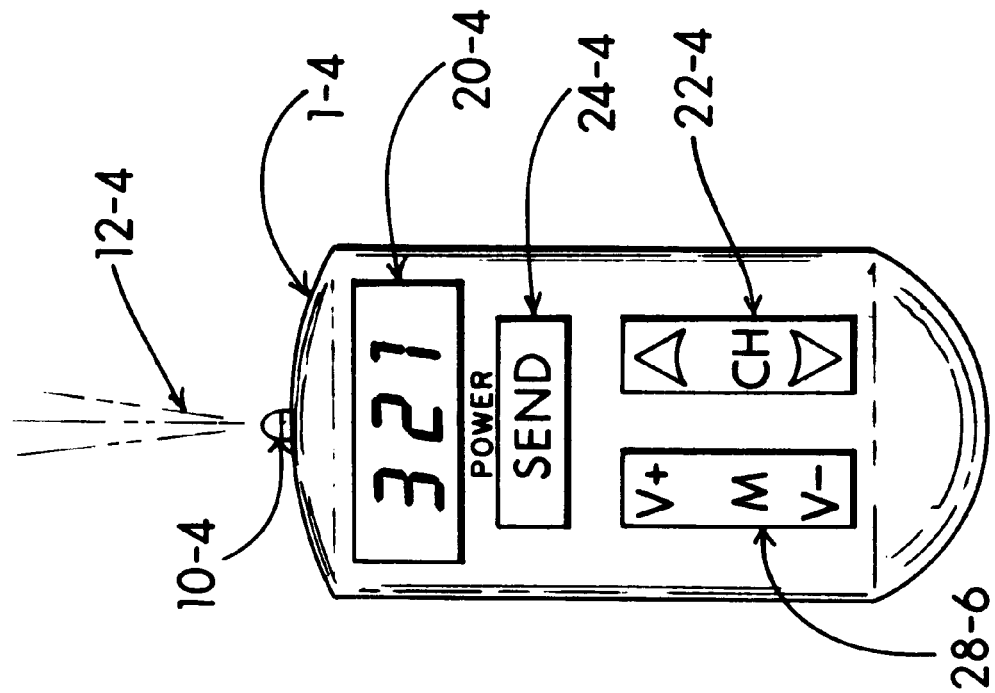
FIG. 4—A varied arrangement of the three key-button control embodiment.
Figure 3:
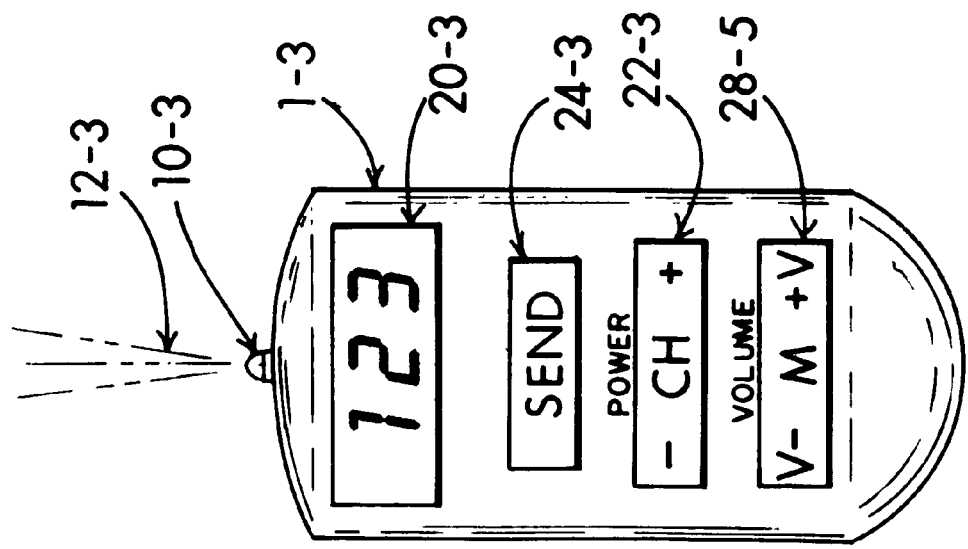
FIG. 3—A further embodiment of the three key-button controller utilizing the channel key-button to also turn power on and off.

FIG. 2, FIG. 3 and FIG. 4 show differing embodiments of the invention sporting merely three key-buttons to service all of the usual channel selection, power control and volume setting functions expected of a remote controller.

The remote control 1-2 in FIG. 2 shows where the CHannel key 22-2 is used to increment the display 20-2 from a default null value to a desired next-selection value, such as the shown channel "164". A desired channel is incremented-to and displayed 20-2 whereupon the user may briefly press the SEND key-button 24-2 that urges the LED 10-2 to send a wireless command signal 12-2 to the televisor 4-2 to change the channel selection to the desired "channel 164". The main difference in this FIG. 2 is an elimination of the separate POWER key-button 26-1 of FIG. 1 accomplished by duplexing the SEND key-button to also provide POWER control. Whereas a brief press of the SEND key-button serves to initiate sending a channel selection to the televisor, a sustained actuation of the SEND key-button (e.g., holding it down) longer than about 2 seconds signals sending a POWER command to the televisor, turning ON a turned-off televisor or else turning OFF an already turned-on televisor. Another showing involves the VOLUME control function, now serviced by a single elongated key-button 28-4. When one end or the other is pressed the volume is increased "+" or decreased "–". Pressing both ends of the key-button in unison, or pressing the center "M" effectuates a sending of the MUTE command.

In FIG. 3 the remote control's layout 1-3 is shown having a display 20-3 that is advanced by the CHannel key-button 22-3. Pressing either end of the key-button 22-3 urges the display 20-3 to increment or decrement until a match between the displayed value and the desired value (depicted as "123") is reached. At this point the SEND key-button 24-3 is pressed, urging the LED 10-3 to send the wireless command signal 12-3 towards the televisor 4-1. Pressing the midpoint of the CHannel key-button 22-3 and holding it actuated to exceed about 2 seconds is determined as a POWER command for turning an "off" televisor 4-1 "on", or else turning an ON televisor "off". This duplex utilization of the CHannel key-button 22-3 also eliminates need for the separate POWER key-button 26-1 shown in FIG. 1.

As shown in FIG. 4 the remote controller 1-4 includes a three digit display 20-4 and CHannel key-button 22-4 mounted vertically. This vertical arrangement may provide a user with a better "feel" of stepping the channel selection value "up" or "down". Once the desired channel number and the displayed number 20-4 match-up (typified by a showing of "321"), the SEND key 24-4 is briefly pressed to urge the LED 10-4 to send the command signal 12-4 to the televisor. As said relative with FIG. 2, the SEND key-button's operation may be duplexed to provide the POWER ON and OFF command signal for the televisor.

Figure 5:
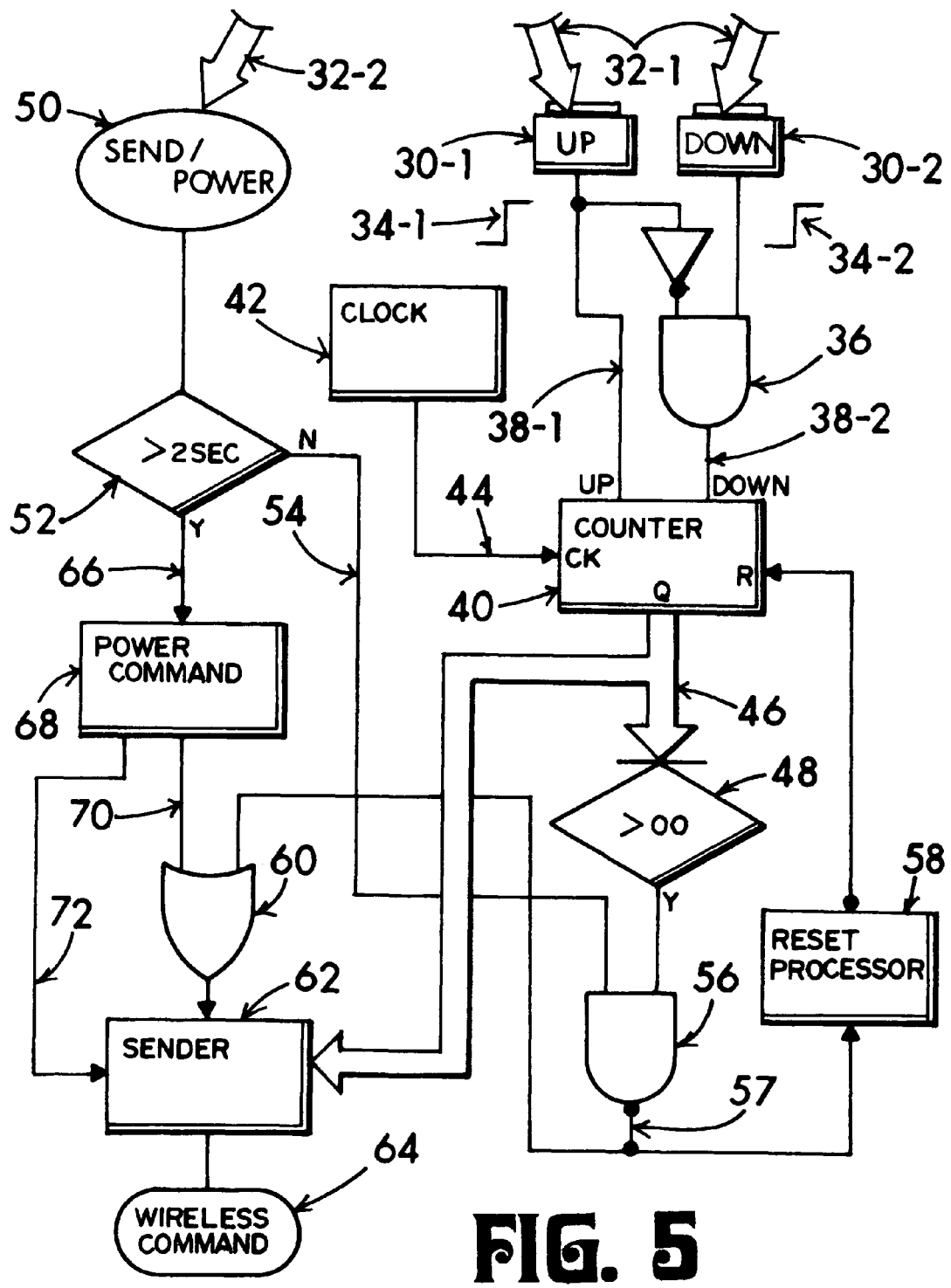
FIG. 5—A flow diagram depicting the channel changing functions.

A flow chart representation of the remote controller's channel selection signal paths is shown in FIG. 5 to include two user actuated 32-1 entry key-buttons 30-1, 30-2. When the UP key-button 30-1 is actuated a signal on line 38-1 enables the counter 40 to increment in conjunction with a predetermined and usually 0.5-hertz to 32-hertz clocking signal 44 delivered from a clock source 42. Conversely, a signal 34-2 delivered by the DOWN key-button 30-2 entry couples through gate 36 and delivers a count-down command 38-2 whicn enables the counter 40 to decrement whenever the present count exceeds unity.

When the counter 40 increments to the desired channel number, as shown on the earlier display 20-1, the user 32-2 may submit the SEND/POWER entry 50 delivering a signal to the conditioner function 52. A brief user actuation 32-2 delivers a true-state signal on the "N" line 54 to a NAND-gate 56, the other input of which is a true-state signal from the conditioner 48 whenever the counter value on the data bus 46 exceeds "00". A /true-state signal on line 57 that couples with the OR-gate 60 while the other gate 60 input line 70 is maintained at a (not-true) $\overline{\text{true}}$-state.

The result is the desired channel number value present on the signal bus 46 couples with the sender 62 and sent to the televisor 4-1 (shown elsewhere) as a wireless command 64. The (not-true) $\overline{\text{true}}$-state signal on line 57 also couples with a reset processor 58, providing a conditioned true-state RESET signal to the counter 40, reinitializing it to the default value (e.g., usually 00).

A prolonged actuation 32-2 of the SEND/POWER entry 50 is recognized by the conditioner 52 when it exceeds about 2 seconds to deliver a true-state signal on the "Y" line 66 to a power command function 68. A true-state appears on line 70, inhibiting the OR-gate 60 and thereby disabling the sender 62 to ignore any data that might be present on the data bus 46. At the same time a true-state signal on line 72 serves to urge the sender 62 to send a POWER signal as a wireless command 64 to the televisor 4-1.

Figure 6:
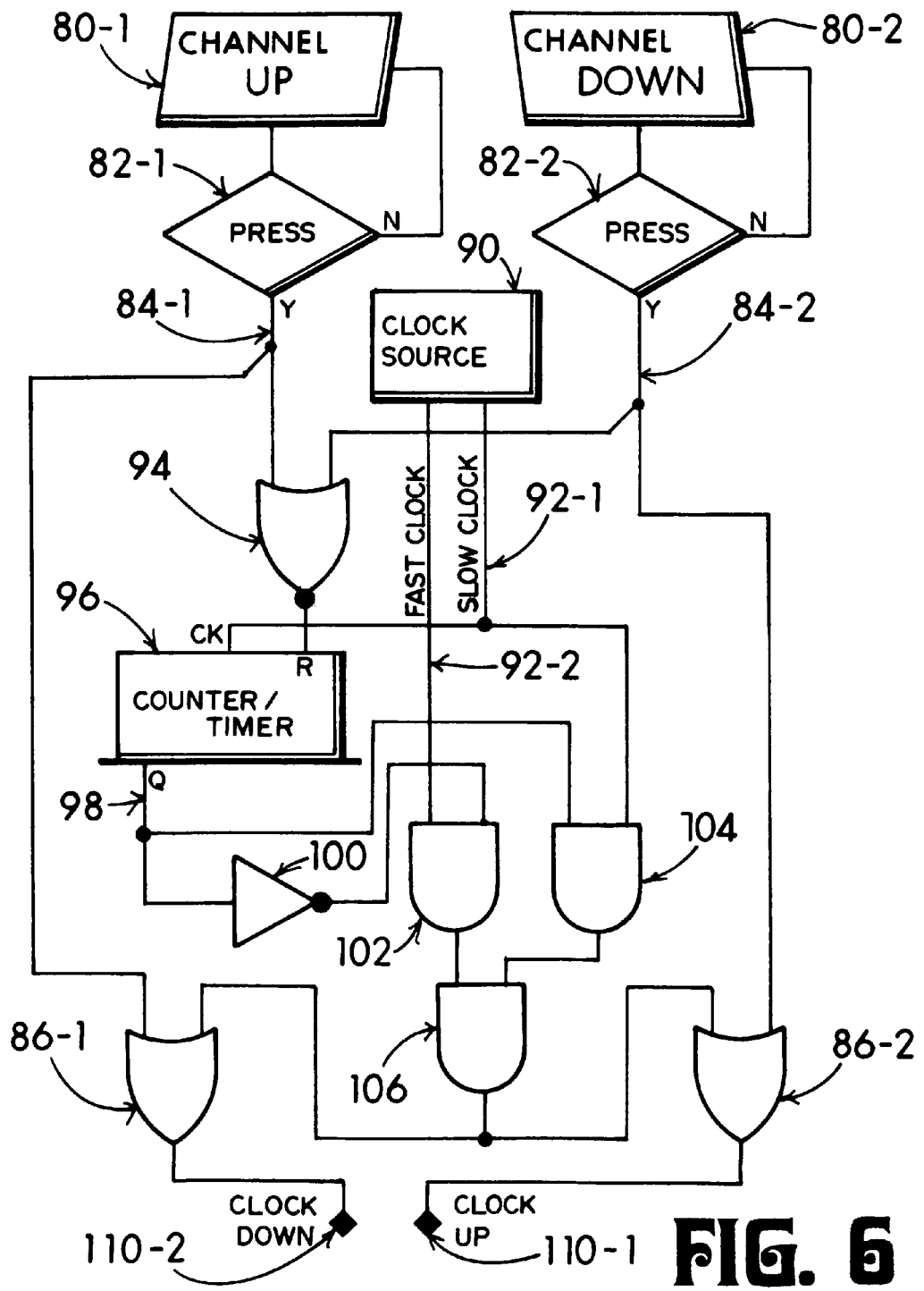
FIG. 6—A flow diagram allowing accelerated channel change.

A dual clock source 90 in FIG. 6 provides a more rapid advance to the desired channel number value. When the CHANNEL UP entry 80-1 is urged, the conditioner 82-1 delivers a true-state signal on line 84-1 to a NOR-gate 94. As a result the reset line on a counter/timer (such as a CMOS industry-type CD4020B binary counter) is enabled and the counter advances. With a typical slow clock rate of 2-hertz on line 92-1, the Q2 or Q3 counter 96 output 98 may set TRUE after several seconds. During the initial period, while output line 98 is low, the LOW state is inverted 100 and coupled with a NAND-gate 102, the other input of which couples with the FAST clock rate, for example an about 20-hertz rate on line 92-2. The output of the NAND-gate 102 delivers the fast clock signal to an AND-gate 106 as coupled with the OR-gates 82-1, 86-2.

After the timer 96 "times-out", the Q output 98 goes HIGH and the inverter 100 delivers a LOW state to the NAND gate 102, inhibiting the fast clock signal flow-through and maintaining the gate 102 output HIGH as coupled with the AND-gate 106. The HIGH state on line 98 presently couples with the NAND-gate 104, enabling it to couple the slow clock pulses 92-1 through to the AND-gate 106 and subsequently to the OR-gates 86-1, 86-2.

While the CHANNEL UP entry 80-1 is maintained, the TRUE output signal on line 84-1 couples with the OR gate 86-1, inhibiting it. Meanwhile the signal on line 84-2 is LOW (false) as coupled with the OR-gate 86-2 enabling the clock pulses coupled through the AND-gate 106 to be delivered to the CLOCK-UP terminus 110-1.

On the other hand, if the CHANNEL DOWN entry 80-2 is actuated, the signal on line 84-2 becomes true (HIGH), inhibiting the OR-gate 86-2. Meanwhile, the channel-up signal on line 84-1 is LOW state, enabling the OR-gate 86-1 to couple the clock pulses delivered from the AND-gate 106 to the CLOCK-DOWN terminus 110-2. What has just been described is a dual clocking provision. When the CHANNEL-UP 80-1 or CHANNEL-DOWN 80-2 entries occur, initially the clock outputs 110-1, 110-2 are slow, preferably about 2-hertz. Then after several seconds, when the timer 96 "times-out", the clock rate may increase to about 20-hertz for example. The slow clocking allows the count to be better managed or stepped. The fast clocking allows the count to advance rapidly to a substantially higher channel number.

Figure 7:
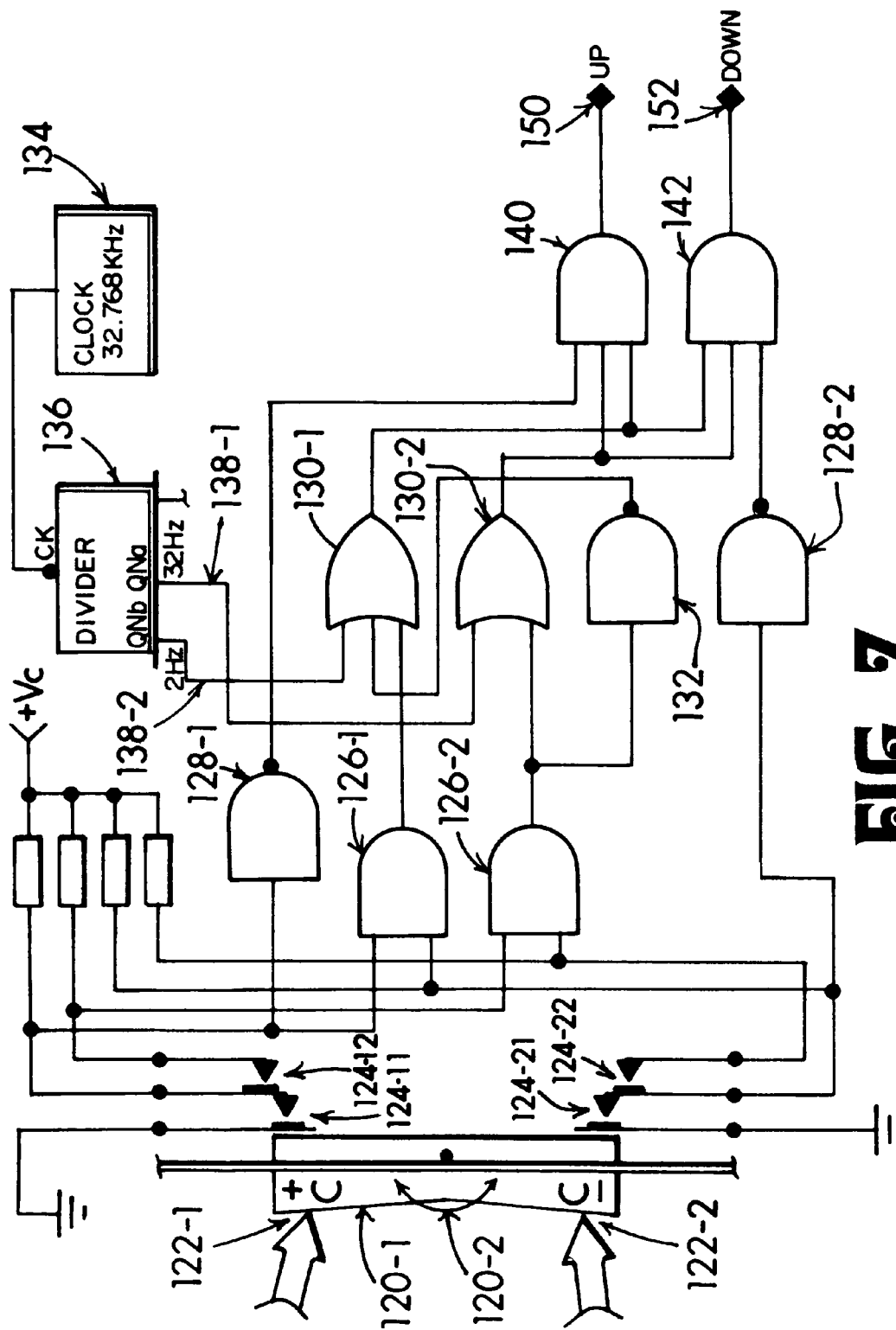
FIG. 7—A functional diagram showing the speed-up of channel selection after a brief key-button hold-down.

FIG. 7 depicts an elongated "rocker switch" key-button 120-1 actuated manual entry for channel UP/DOWN selection. The rocker action may pivot 120-2 about a midpoint. Moreover, the switch enables the user to "go slow" or "go fast" in advancing the numerical digits on the display. This option is attained by utilizing a unique switch having a double action contact sets, operative such that for channel-UP user-actuation 122-1, a moderate press closes the contact set 124-11 and a firmer press further closes the contact 124-12 against the already closed contact 124-11. Similarly for channel-DOWN user-actuation 122-2, the moderate press closes the contact 124-21 and the firmer press further closes the contact 124-22 against the already closed contact 124-21.

The clock 134 is shown to operate at 32.768-KHz, while the divider 136 is shown to reduce the frequency at the selected Qua output 144-1 to about 32-Hz and the shown Qnb output 144-2 may be selected to deliver 2-Hz. Realize that other choices may be made by the design practitioner.

Up-Count Management

When the contact 124-11 closes against ground, a first input of an AND-gate 126-1 is LOW, causing the gate's output to become unconditionally LOW as coupled with a first input of an OR-gate 130-1. The result is an enabling of the OR-gate 130-1 allowing the slower 2-Hz clock pulses 138-2 to couple through the AND-gate 140 and port from the CLOCK-UP output 150. The user may option to "speed things up" by pressing 122-1 the key-button +C end until the contact-set 124-12 closes, placing a LOW state on a first input of an AND-gate 126-2, forcing the gate's output to be driven unconditionally LOW as coupled with an input of an OR-gate 130-2, enabling the gate to pass the 32-Hz clock signal from the divider output 138-1 through the AND-gate 140 and the CLOCK-UP output port 150. To prevent collision of the 2-Hz clock pulses and the 32-Hz clock pulses, the AND-gate 126-2 presently LOW output couples with an inverter 132 having a driven-HIGH output coupling with the OR-gate 130-1 input thereby blocking throughput of the 2-Hz clock pulses and a forced HIGH state on the OR-gate 130-1 output as coupled with the AND-gates 140, 142.

Down-Count Management

When the contact 124-21 closes against ground, the second input of the AND-gate 126-1 is forced LOW, causing the gate's output to become unconditionally LOW as coupled with the input of the OR-gate 130-1 and the inverter 128-2. Thus the OR-gate 130-1 is enabled to pass the 2-Hz clocking signal on line 138-2 with it's output directed to an AND-gate 142. The inverted HIGH state from the inverter 128-2 enables the AND-gate 142 which presents the clock signal to the CLOCK-DOWN port 152. Meanwhile, by virtue of the presently LOW-state delivered from the inverter 128-1 (because the contact set 124-11 is open when the contact set 124-21 closes) forces the correspondent input of the AND-gate 140 LOW, inhibiting clock signal flow-through to port 150. A further actuation 122-2 of the C− key-button closes contact-set 124-22 which changes the clock speed selection from the slower 2-Hz rate to the faster 32-Hz rate, similar in response to the closure of the just-described contact-set 124-12 action. Meanwhile, the AND-gate 142 is enabled and the AND-gate 140 is maintained disabled.

Figure 8:
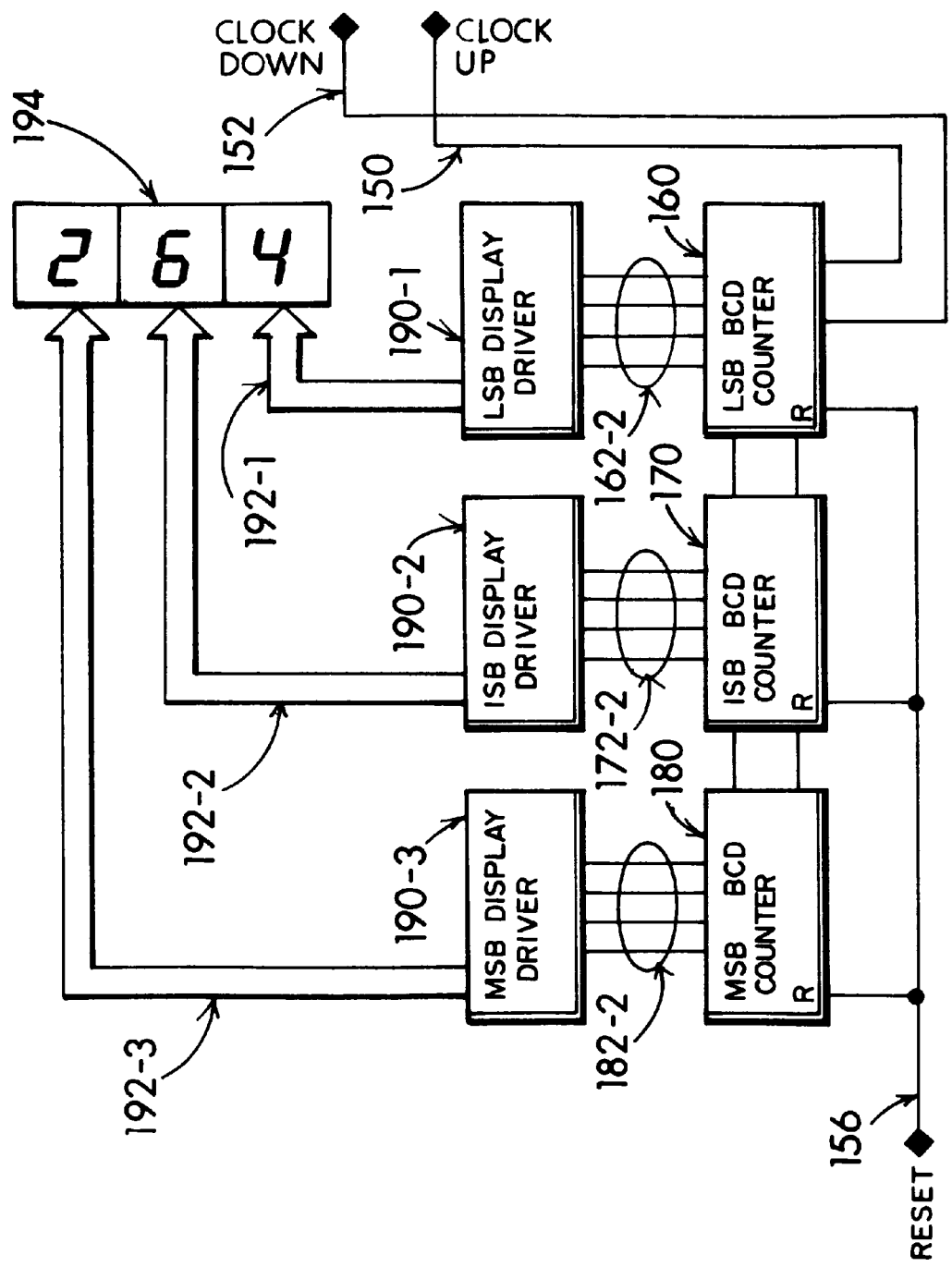
FIG. 8—An extension of FIG. 7 showing the channel number display.

The CLOCK-UP signal 150 and CLOCK-DOWN signal 152 derived from the hookup of FIG. 7 are deployed to a LSB-BCD counter 160 in FIG. 8. As a result, the counter 160 may advance at the selected 2-Hz or 32-Hz rate, producing advancement of the LSB display (1's place weight) numeric value 194 from 0 to 9 as delivered through a display driver 190-1 on signal bus 192-1. The LSB-BCD counter 160 (for example, an industry type CD40192B) includes a $\overline{\text{CARRY}}$ and $\overline{\text{BORROW}}$ output correspondingly coupled with a CLOCK-UP and CLOCK-DOWN input of an ISB-BCD counter 170 delivering an ISB (intermediate significant byte) data signal that advances the midmost (or 10's place weight) digit of the display 194 through an ISB Display Driver 190-2 and intercoupling bus 192-2.

The ISB-BCD counter 170 further includes a $\overline{\text{CARRY}}$ and $\overline{\text{BORROW}}$ output correspondingly coupled with a CLOCK-UP and CLOCK-DOWN input of a MSB-BCD counter 180 delivering a MSB data signal that advances the left-most (or 100's place weight) digit of the display 194 through a MSB display driver 190-3 and intercoupling bus 192-3. As depicted, a RESET signal on line 156 may reset the several counters to a default null value and usually expressed as a binary 0000 on the output lines 162-2, 172-2 and 182-2.

A variant example of a "rocker style" key-button switch appears in FIGS. 9-12. As shown the switch lever 200 in FIG. 9 is in a mechanically neutral position typically maintained by a spring 202 or other known practice. In this setting, both the contact-sets 210-1 and 212-1 are OPEN. Upon pressing 32-2 the rightmost end of the switch lever 200 in FIG. 10, the contact set 212-2 closes while the contact set 210-1 is maintained open. By extension, pressing 32-3 the leftmost end of the switch lever 200 in FIG. 11 produces closure of the contact set 210-1, while the contact set 212-1 is maintained open.

In a more advanced way, pressing the midpoint (or both ends concurrently) depresses the overall key-button 200 against a compression spring 202 and acts to concurrently close both switch contact sets 210-2 and 212-2.

Figure 13:
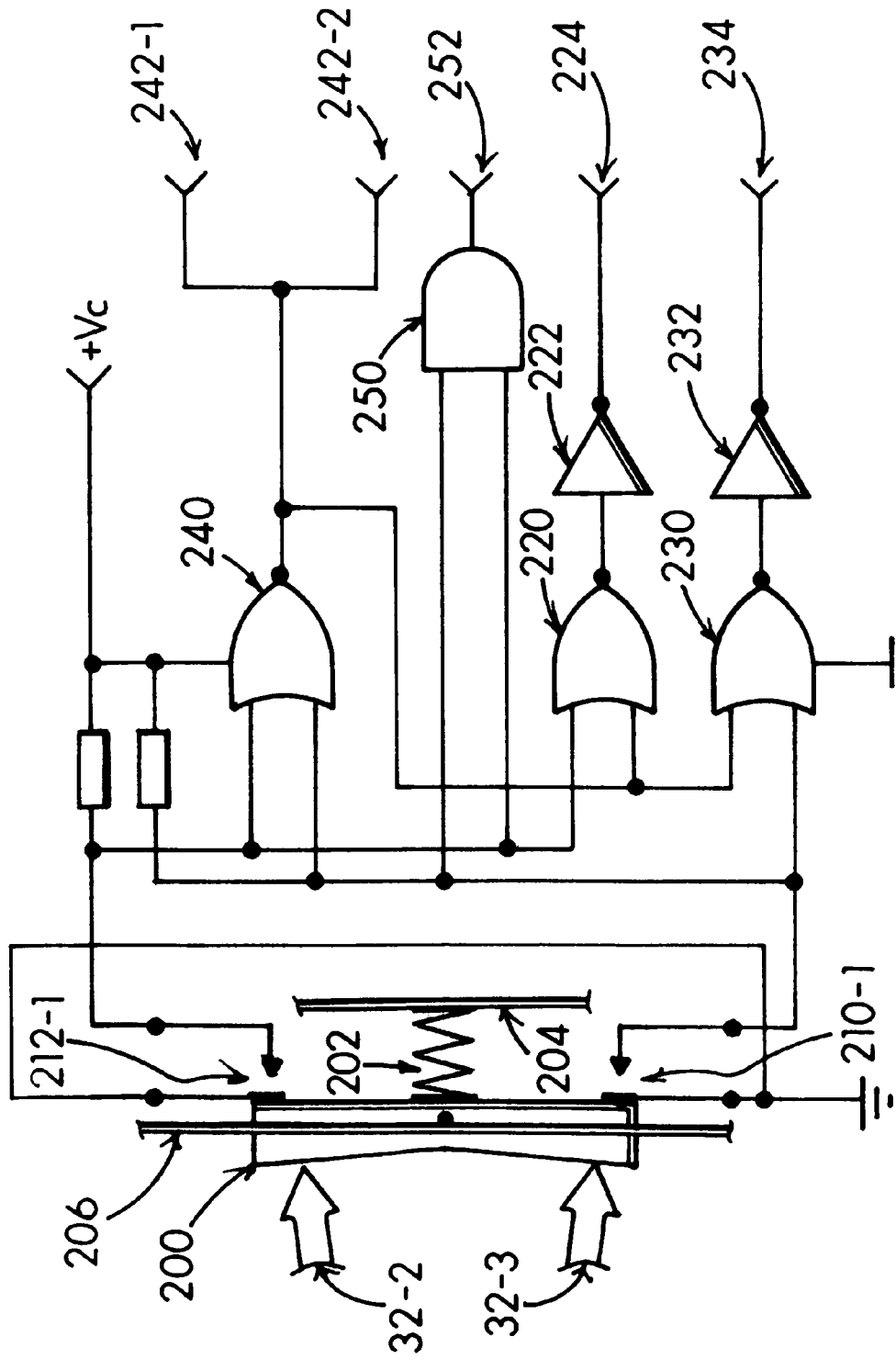
FIG. 13—A rocker switch adapted to provide three signal functions of "channel up and down" and "power".
Figure 14:
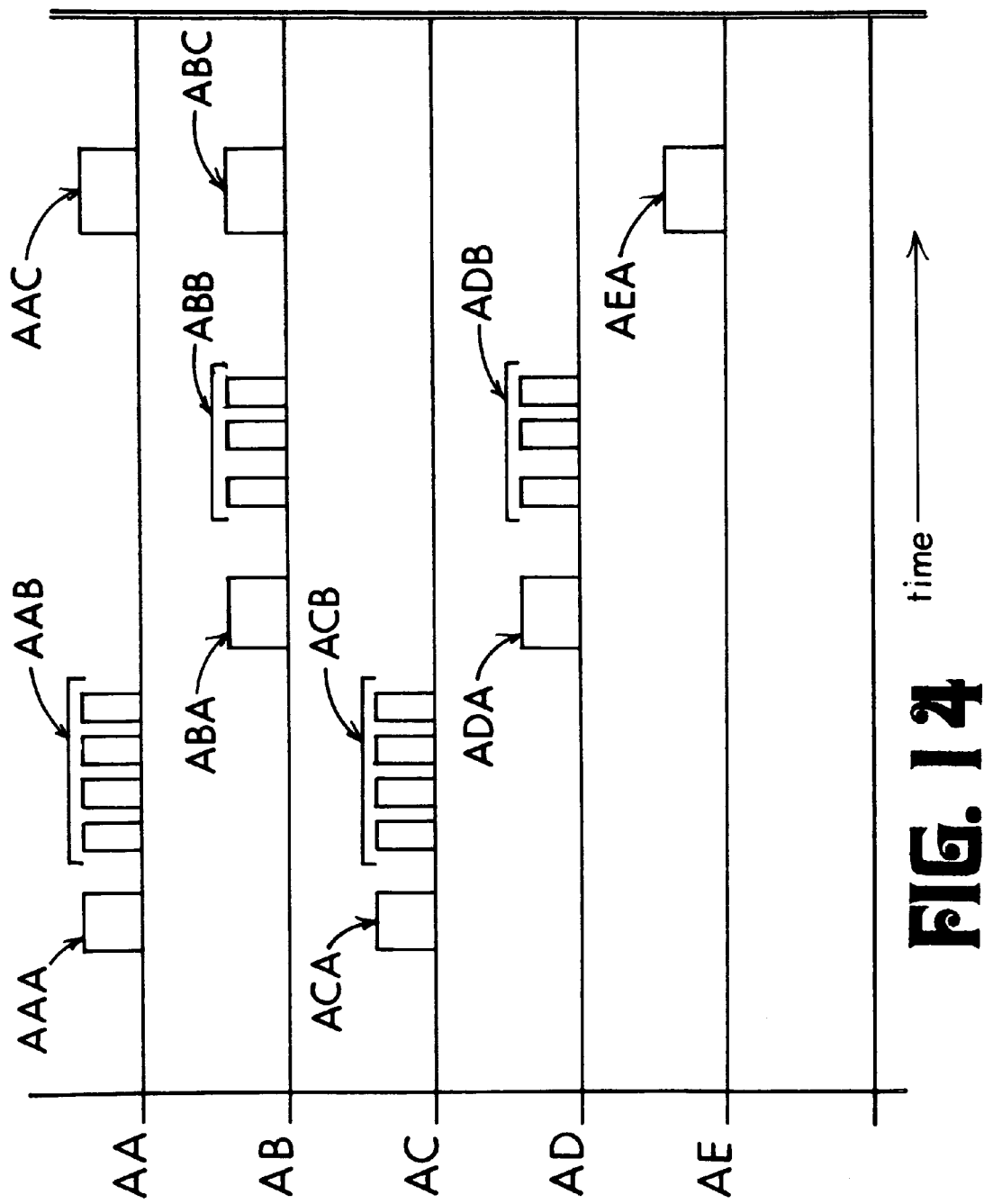
FIG. 14—A signal diagram relative with FIG. 12.

The utility of these switch action options of FIGS. 9-12 is illustrated in FIG. 13 in conjunction with FIG. 14 to deliver a CONTROL signal on ports 242-1, 242-2 and an ENABLEMENT signal on a port 252. When the user actuates 32-2 the uppermost switch contacts 212-1, the successive switch actions AAA or AAB produce contact set closures as might be shown by FIG. 10 which introduces a LOW state to a NOR-gate 224 that delivers an +VOLUME [UP] action signal ABA, ABB delivered on port 224. In a similar way, when the user actuates 32-3 the lowermost switch contacts 210-1, the successive switch actions ACA or ACB produce contact set closures as depicted in FIG. 11 to deliver a LOW state to a NOR-gate 230 that delivers a −VOLUME [DOWN] action signal ADA, ADB delivered on port 234. Observe that pull-up resistors coupled with a source of +Vc maintain the open state of either switch at a logic-HIGH level as coupled with the OR-gates 220, 230 as well as the two inputs of a NOR-gate 240. Find now that when BOTH switches 210-1, 212-1 are simultaneously actuated AAC, ABC and closed as said earlier in FIG. 12, both inputs of the NOR gate are forced LOW and the NOR-gate 240 output line is forced HIGH AEA as coupled with the MUTE lines 242-1, 242-2. The HIGH state also couples with an input of each of the NOR-gates 220, 230 in effect driving their state through level-inverters 222, 232 to maintain a LOW-state signal to both ports 224, 234. An AND-gate 250 having two inputs independently coupled with both of the contact-sets 210-1, 212-1 yields a wake-up signal on port 252 when either (or both) switches are closed (e.g., when any entry is made). The wale-up signal delivered on line 252 may initiate applying power to the sender and other power-hungry portions of the controller.

Figure 15:
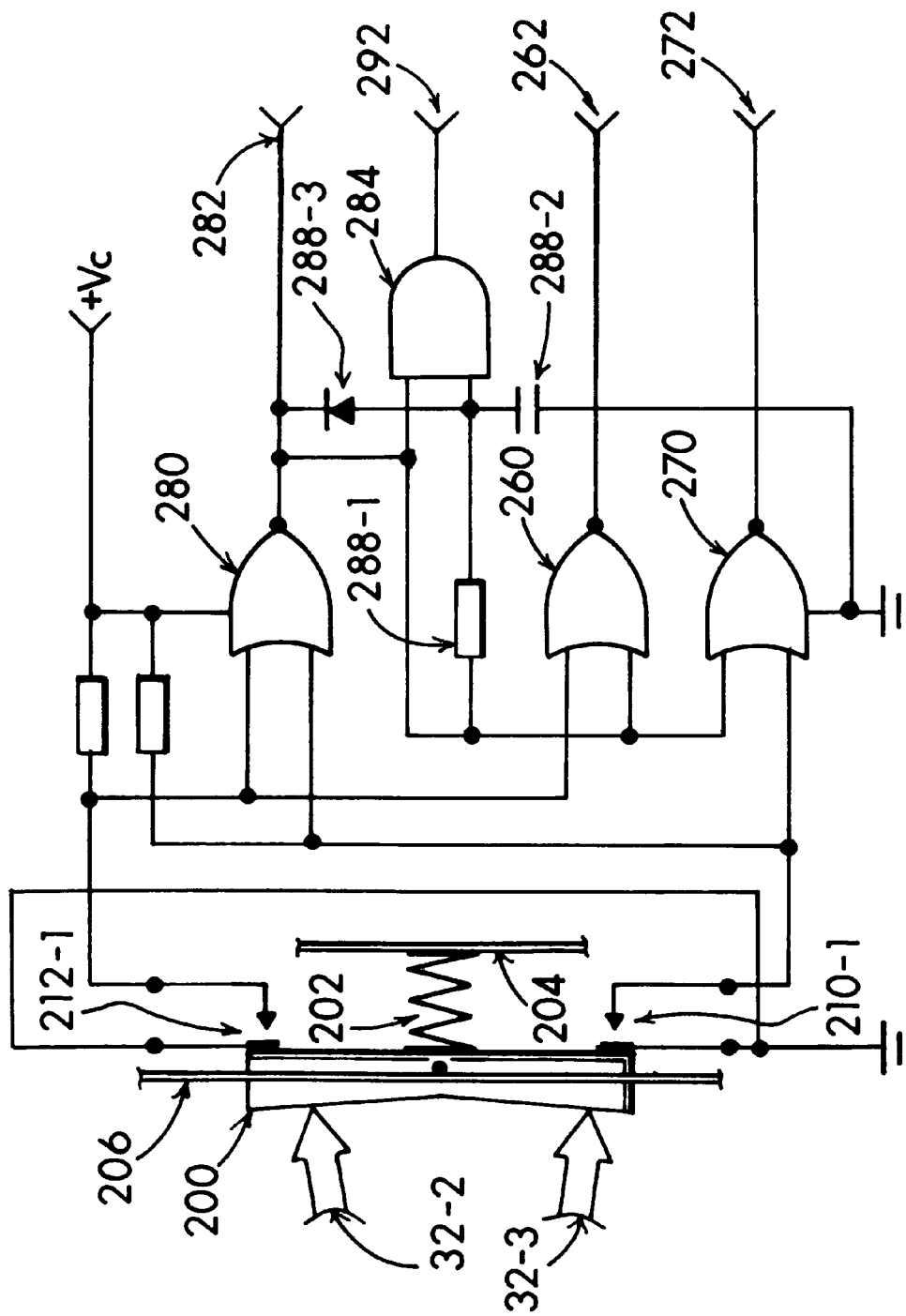
FIG. 15—A rocker switch adapted to provide three signal functions of "volume up and down" and "mute".
Figure 16:
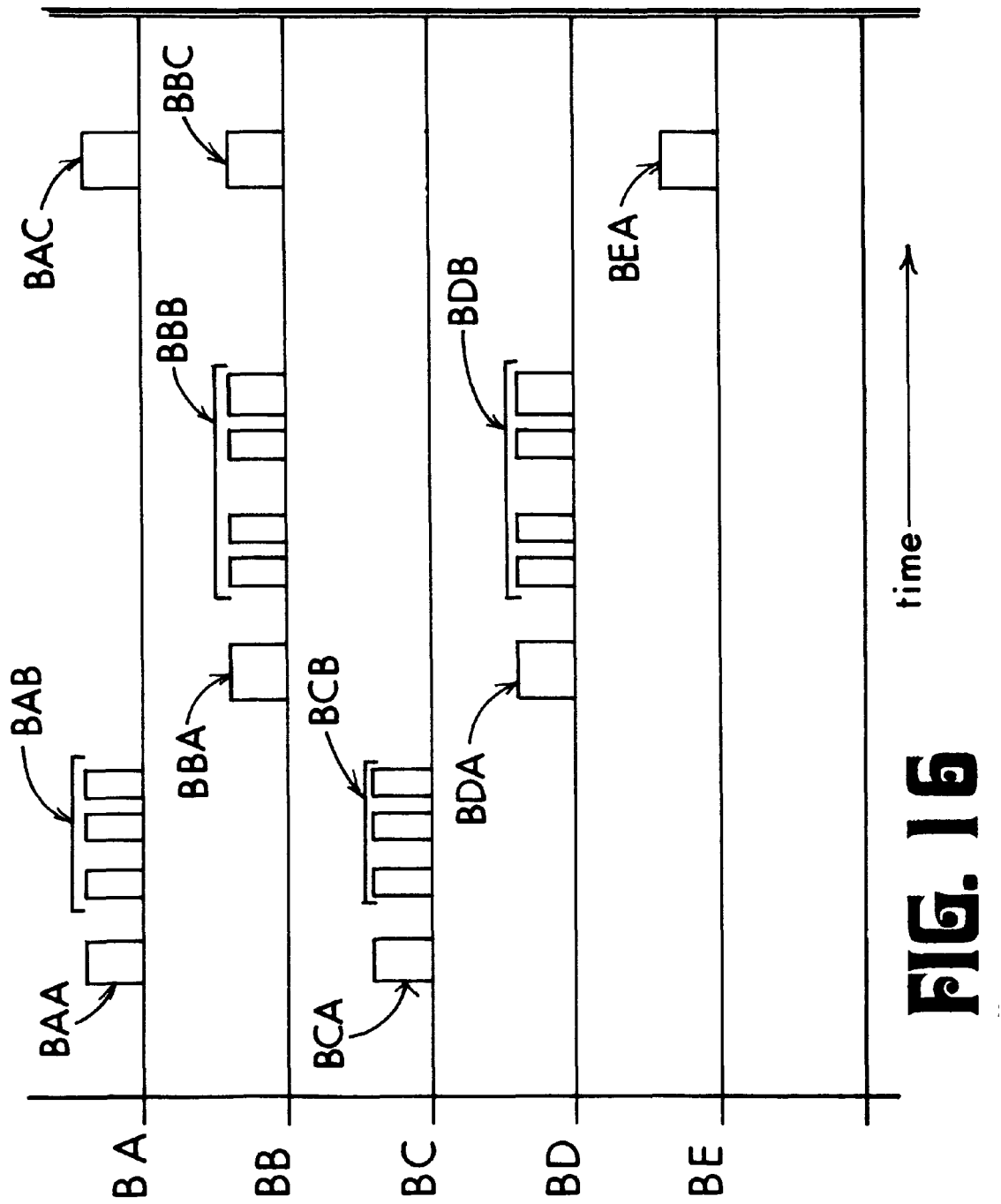
FIG. 16—A signal diagram relative with FIG. 14.

A further expression for the utility of these switch action options of FIGS. 9-12 is further illustrated in FIG. 15 in conjunction with FIG. 16 to provide a CONTROL signal on port 282. When the user actuates 32-2 the uppermost switch contacts 212-1, the successive switch actions BAA and BAB produce contact set closures as might be shown by FIG. 10 which introduces a LOW state to a NOR-gate 280 that delivers an UP-COUNT action signal BBA, BBB delivered on port 262. In a similar way, when the user actuates 32-3 the lowermost switch contacts 210-1, the successive switch actions BCA, BCB produce contact set closures as depicted in FIG. 11 to deliver a LOW state to a NOR-gate 270 that delivers a DOWN-COUNT action signal BDA, BDB delivered on port 272. Observe that pull-up resistors coupled with a source of +Vc maintain the open state of either switch at a logic-HIGH level as coupled with the OR-gates 260, 270 as well as the two inputs of a NOR-gate 280. Find now that when BOTH switches 210-1, 212-1 are simultaneously actuated BAC, BBC and closed as said earlier in FIG. 12, both inputs of the NOR-gate are forced LOW and the NOR-gate 280 output line is forced HIGH BEA as coupled with the CONTROL line 282.

In order to thwart false signals from the NOR-gate 280 that might be caused by inadvertent parallel actuation of the switch contact-sets 210-1 and 212-1, a slight delay is included by imposing a resistor 288-1 and a capacitor 288-2 to integrate the LOW to HIGH state change applied to one input of an AND-gate 284. The slight delay reduces a likelihood for a false signal to be delivered from the output 292. The signal from outputs 282 and 292 are functionally similar except for the slight delay introduced by the integrator. About 100 milliseconds has been found to be appropriate as the integrator's time constant. A recovery diode 288-3 resets the integrator.

The HIGH state delivered from the NOR-gate 280 output also couples with an input of each of the NOR gates 260, 270 in effect driving their state to maintain a LOW-state signal to both ports 262, 272. The CONTROL signal delivered on line 282 may be utile for manual initiation of a SEND command signal or a POWER-ON/OFF command signal at the option of a design engineer who practices this invention.

Figure 17:
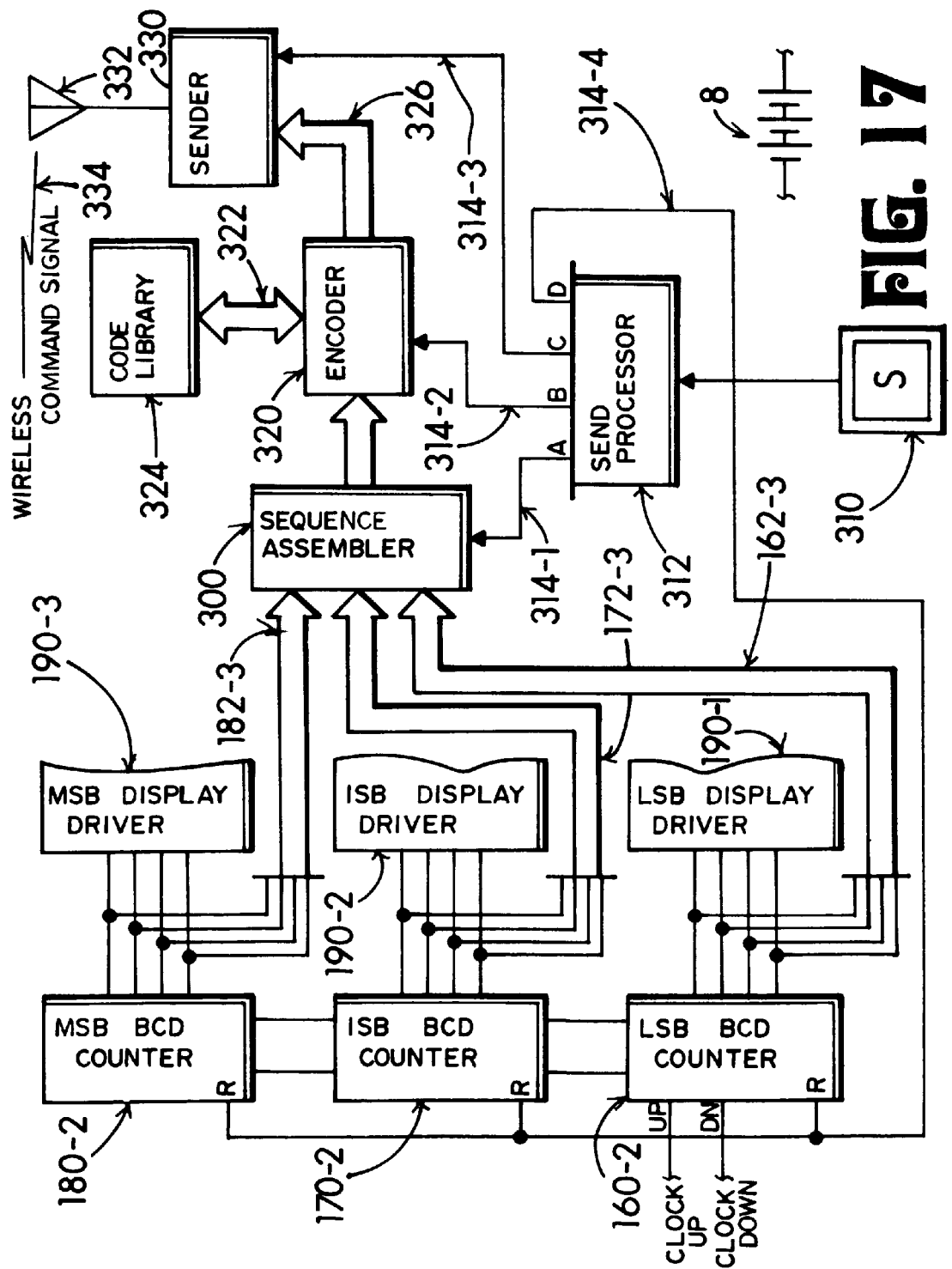
FIG. 17—A diagrammatic overview of a remote control channel-change wireless commander.

A wireless remote control configuration shown in FIG. 17 utilizes a discrete SEND key-button 310. Three channel number accumulators 160-2, 170-2, 180-2 are loaded with a desired channel in accord with the teaching of FIG. 8. Each of the counter outputs are routed 162-3, 172-3, 182-3 to a SEQUENCE ASSEMBLER 300, which conditions the desired channel values into a device-specific format suitable for the intended televisor. The desired channel selection signal routes to an ENCODER 320 which in conjunction with an attendant code library couples 322 the unique encoding instructions applicable to a particular make and model of televisor sought to be commanded. When the SEND instruction 310 is entered by the user a send processor attends to progressing operation of the sequence assembler 314-1, the encoding of the channel selection values 314-2, instructing 314-3 the sender 330 to transmit 332 the data bus 326 command signals and lastly sending a default-value reset signal 314-4 back to the counters 160-2, 170-2, 180-2. As is usual practice with portable remote controls, a battery 8 may provide necessary d.c. power.

Figure 18:
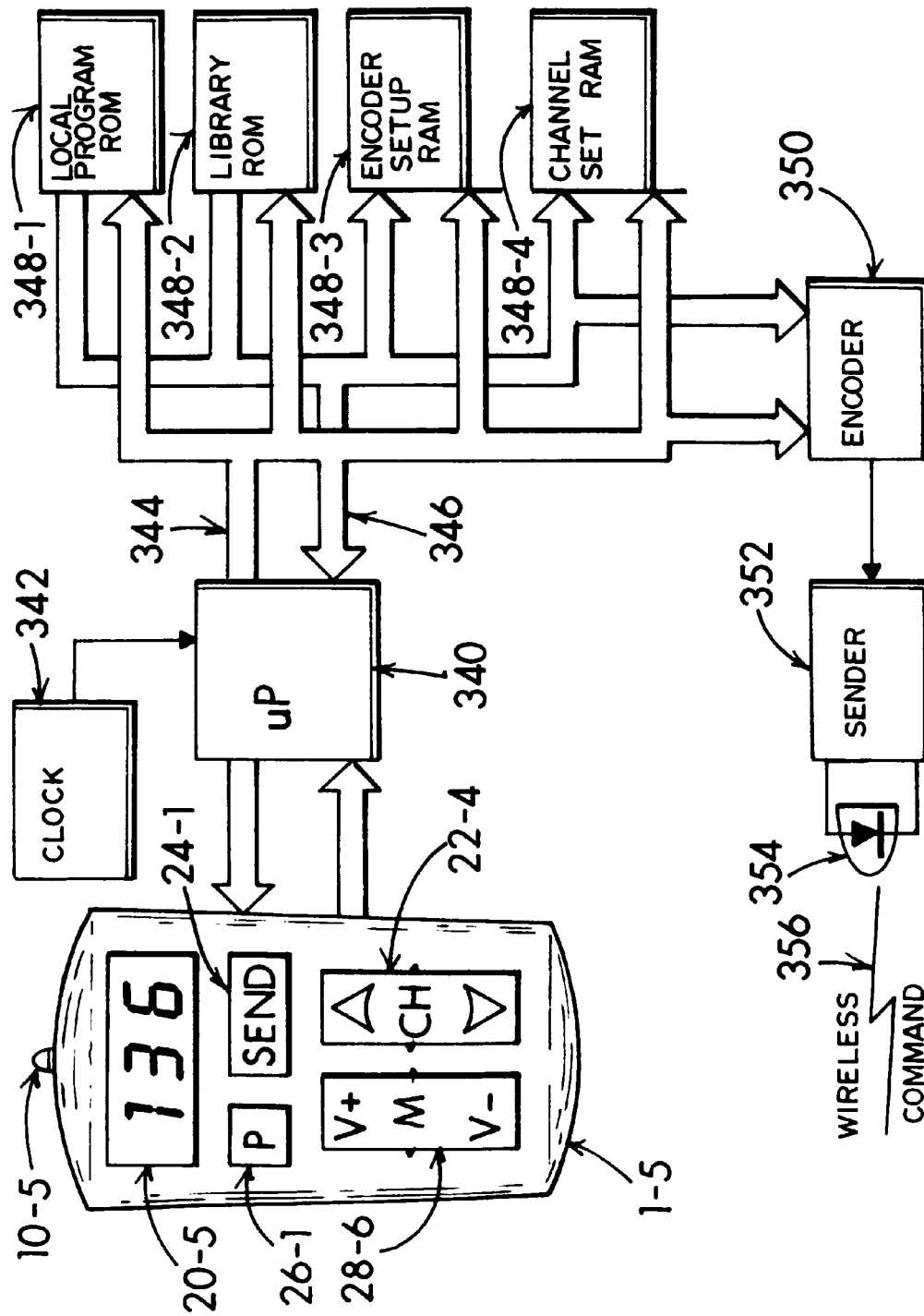
FIG. 18—Utilizing a microprocessor with the commander.

Although prior art abounds with the use of a microprocessor in the management of remote controller functions, FIG. 18 depicts how such an embodiment may relate to the invention. A portable apparatus 1-5 is depicted which sports four key-button and a digital display 20-5 to produce a command signal sending from an emitter 10-5. A microprocessor (uP) 340 includes keypad data lines that interface with a CH[UP/DOWN] duplex key-button 22-4, a SEND key 24-1, a Power key 26-1 and a VOLUME/MUTE duplex key-button 28-6. The microprocessor also drives the numeric display 20-5, presently showing channel "136". The microprocessor operates from a clock 342 and includes a system control bus 344 and data bus 346 that couples with a local program (operating system) ROM 348-1, a library ROM 348-2, an encoder setup RAM 348-3 and a channel-set RAM. The two RAMs 348-3, 348-4 perform as temporary scratchpad memories for holding desired channel numbers and their related encoded command data exchanged with the encoder 350 in preparation for routing to the sender 352 for wireless command transmission 356 by a LED 354 for example.

Figure 19:
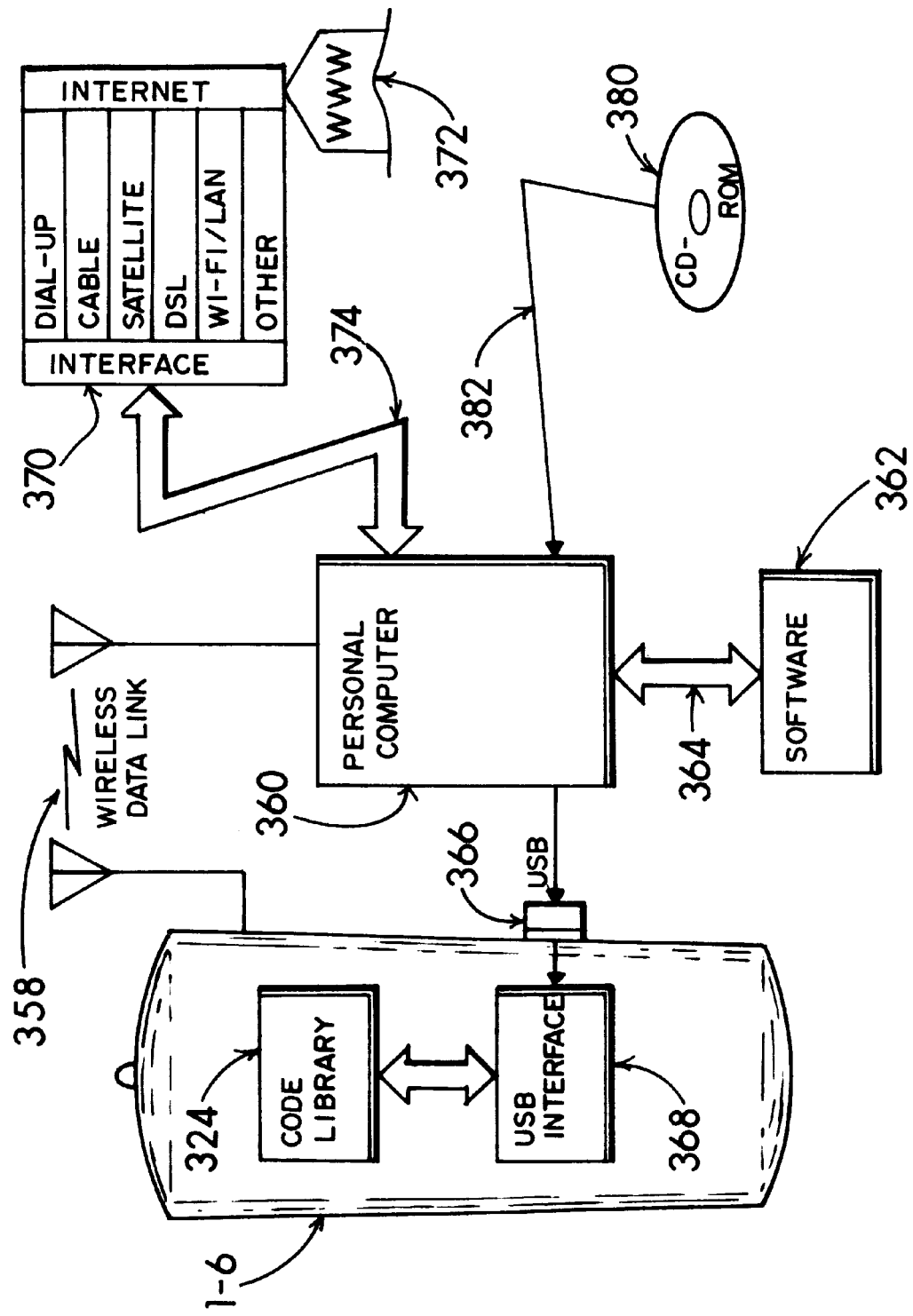
FIG. 19—External updating of televisor specific codes made possible utilizing a personal computer.

Remote command capable televisors come in may makes and models, each having a unique set of "device specific" encoding requirements to achieve full control of their function potential. New models require new code data. FIG. 19 tells how a personal computer (PC) 360 might be used in conjunction with a data port, such as a USB interface 366, 368 to upgrade a code library 324 portion of a portable remote controller 1-6. The PC 360 may obtain new code data from numerous sources on the world wide web 372 via the internet interfaced by a dial-up, cable, satellite, DSL or WI-FI/LAN or other means. The updated data may also reach distribution by utilizing a CD-ROM 380 coupled 382 with the PC 360.

In order to prevent a false SEND in lieu of an intended POWER command, the earlier configuration of FIG. 15 and elsewhere may be enhanced to recognize that a short-duration concurrent closure of the switch contact sets 210-1, 212-1 when acted upon in a manner described relative with FIG. 12

Figure 20:
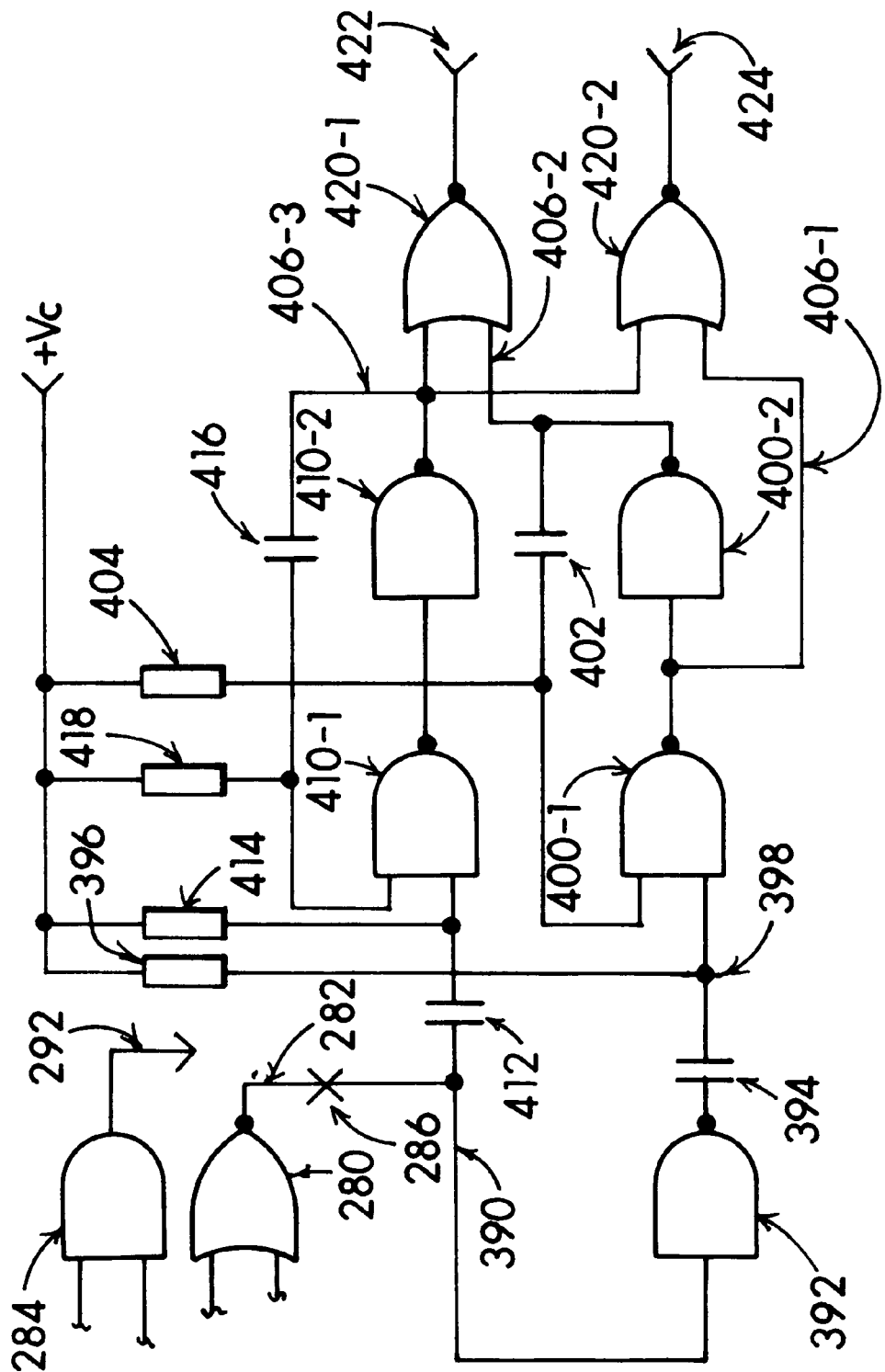
FIG. 20—A logic diagram demonstrating an entry filter for duplexing SEND and POWER command through the same key-button.

(concurrent closure) means to SEND the channel selection command. On the other hand, a sustained parallel actuation of the switch contact sets 210-1, 212-1 is intended to deliver the POWER ON/OFF command for the televisor. To differentiate between these two intended sendings, a monostable multivibrator (one-shot) comprising NAND gates 400-1 and 400-2 along with a capacitor 402 and resistor 404 are depicted in FIG. 20 to construct a timer with an about 2 second duration. The one-shot is triggered by the leading edge of the key-button actuation signal, for example delivered on line 390 by NOR-gate 280 of FIG. 15. The signal on line 390 is inverted 392 (waveform CAA of FIG. 21) and applied to an input of the NAND-gate 400-1 through a capacitor 394 combined with a resistor 396 to provide an integrated "spike" pulse signal on line 398 that initially sets the one-shot to produce a HIGH state CBA, CBB on line 406-1 and a LOW state on line 406-2 that maintains for the duration of the timing period.

When the key-button switch contacts are opened CABA the signal on line 390 is driven LOW. The trailing edge of the signal couples through an integrative capacitor 412 that together with resistor 414 provide a "negative-spike" signal on an input of a NAND-gate 410-1 that together with NAND-gate 410-2, capacitor 416 and resistor 418 comprise a preferably about 100-millisecond timer. During the time period CCA the signal on line 406-3 is driven LOW as coupled with an input of the two NOR-gates 420-1, 420-2.

Figure 21:
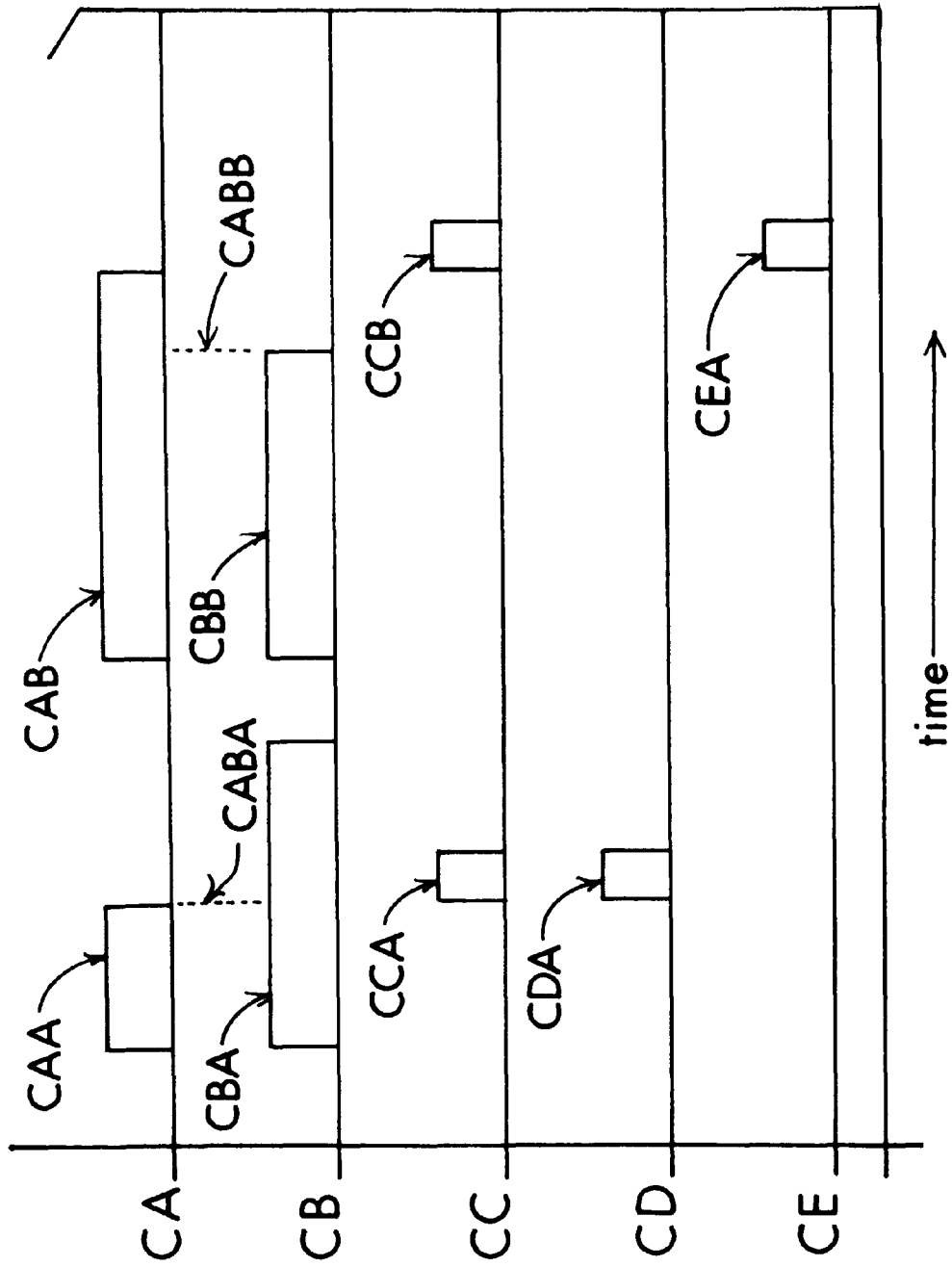
FIG. 21—A signal diagram relative with FIG. 20.

When the release of the key-button occurs prior to elapse of the 2-second time period the HIGH state on line 406-1 inhibits the NOR-gate 420-2, while the LOW state on line 406-2 enables the NOR-gate 420-1 to couple-out the 100-millisecond signal CCA on line 406-3 to the SEND output 422, for example CDA of FIG. 21.

When the key-button is maintained in an actuated state beyond the 2-second timeout of the one-shot signal on line 406-1, a subsequent release CABB of the key-button allows the 100-millisecond signal CCB on line 406-3 to couple through the NOR gate 420-2 to the POWER-command signal CEA output 424.

A TV Channel Guide exhibits in FIG. 22 to show that in a prominent television system (Comcast) the numerical spread in channel number choices extends between single-digit, double-digit and triple-digit values (for example, channel 4, 58 and 341).

Practice Caveats

A reasonable and comprehensive effort has been made to explain this invention in a manner which enables a person of quite ordinary skill and with in the art to readily grasp the invention's intent and subsequently practice the teachings. The utter essence of this invention is to absolutely and remarkably reduce the number of keys on a televisor's remote controller without compromising a capability for making abrupt changes from one channel to another. The goal is to simply switch to the next desired channel number without stepping the televisor through the intervenient channels. This invention teaches how duplex usage of merely one key may enable preselection any one of as many as 99 (or even 999) channels before a selection is sent to the televisor, cable box, or satellite receiver.

A skilled artisan may reasonably develop alternate details for this invention's implementation including a considerable variation regarding physical structure details, key-button arrangement, electronic data-signal inter-coupling, wired or wireless connection interface, software style and firmware configuration and obvious operational preferences tailored to a specific market niche or applicability. These mere variants naturally occur as an obvious outspread from the invention's central novelty and practicable examples. Such variants and exceptions shall result from merely expressing applied engineering skill combined with an ever-increasing plethora of options regarding electronic and hardware elements, techniques and programming skills which may be utilized to embody practice of this invention in the art-field. It is realized that hindsight cleverness may suggest other directions for engineering physical and technical embodiments exhibiting operational detail variations from that which is herein specifically depicted. These variants may become readily apparent to and subsequently implemented by others. Practitioners of this invention are cautioned that all technical hookup, signal processing and physical embodiment variations irrespective of their extent are to be suspiciously considered as mere natural and obvious extensions of this invention's central teachings. In particular this includes consolidating the power and send key functions, the volume level and mute key functions and the use of a display in conjunction with a SEND button to predefine a next channel choice before jumping to it. Any scheme which satisfies at least these objectives of this invention shall be found as merely anticipated obvious modifications of or extensions to the essence of this invention's fundamental novelty. Obvious engineering refinements, embodiment practices and operational details shall be construed to be irrefutably within the scope of this invention as presently taught and inclusively claimed.

I claim for my invention:

1. A television remote control method, comprising:
   selecting a desired channel number;
   rendering a counter's output states on a numerical display;
   entering and maintaining a manual actuation of a first key-button to enable a clock pulse signal to incrementally advance the counter output value;
   displaying the incremental advancing of the counter output value on the numerical display; and,
   releasing the first key-button actuation when a currently displayed numerical value advances to and matches a desired channel number;
   whereby maintaining the actuation of the first key-button enables the displayed numerical value to advance to the desired channel number.

2. The television remote control of claim 1 comprising:
   finding a substantial difference between the currently displayed number and the desired channel number; and,
   increasing extent of the actuation of the up-count key-button enables a more rapid incrementation of the counter output states;
   whereby upon finding the substantial difference the counter incrementation is sped-up to reduce wait-time until the displayed number and the desired channel number are a match.

3. The television remote control method inclusive of claim 2 further comprising:
   duplexing a POWER ON/OFF command with the SEND command control key-button; manually actuating the control key-button for an initial interval to produce the SEND command signal; and,
   maintaining manual actuation of the SEND control key-button exceeding the initial interval to effectuate sending an encoded POWER command to the televisor for turning it ON when it is initially OFF and conversely turning it OFF when it is presently ON
   whereby the combining of the SEND command and the POWER command in one duplex-function key-button lessens the key-button population.

4. The television remote control method of claim 2 comprising:
manually actuating either one of a separate VOLUME-UP and VOLUME-DOWN key-button, to send a volume setting command to the televisor;
whereby the remote control commutes a volume setting command signal enabling adjustment of the televisor's volume level.

5. The television remote control method of claim 4 further comprising:
concurrently pressing both of the separate VOLUME-UP and VOLUME-DOWN key-buttons in unison to send a mute command signal to the televisor;
whereby a manual pressing of both of the volume setting key-buttons in unison produces a MUTE command signal enabling a quieting of the televisor's audio level.

6. The television remote control method of claim 2 comprising:
sharing manual actuation of a rocker key-button having two operative positions aside from a neutral mid-position;
manually pressing a first end sends a VOLUME-UP volume setting command to the televisor; and,
manually pressing a second end sends a VOLUME-DOWN volume setting command to the televisor; and,
whereby the manual actuation of the rocker key-button produces a volume setting command signal enabling adjustment of the televisor's volume level.

7. The television remote control method of claim 6 comprising:
concurrently pressing both the first end and the second end, and otherwise depressing a mid-position of the rocker key-button initiates a MUTE command signal;
whereby the volume setting rocker key-button is duplexed to produce the MUTE command signal enabling a quieting of the televisor's sound level.

8. The television remote control of claim 1 comprising:
manually submitting a SEND key-button entry subsequent to finding the match between the displayed numerical value and the desired channel number; and,
encoding and sending a wireless command signal weighted by the displayed numerical value;
whereby a user submits the SEND entry when the displayed numerical value matches the desired channel number subsequently sending the numerical value as an encoded wireless channel-change command.

9. The television remote control of claim 1 comprising:
determining the counter output values shown on the numerical display overstep the desired channel number;
maintaining a manual actuation of a second key-button enabling the clock pulse signal to decrement the counter output values; and,
displaying the decrement of the counter output values on the numerical display;
releasing the second key-button actuation when the displayed numerical value matches the desired channel number;
whereby when the counter output value overshoots the desired channel number, the counter output value is decremented until the match is reached relative with the desired channel number.

10. The television remote control of claim 9 comprising:
sharing manual actuation of a rocker key-button having two operative positions aside from a neutral mid-position;
manually pressing a first end equates with the first key-button for enabling the incrementing the counter output values;
manually pressing a second end equates with the second key-button for enabling the decrementing of the counter output values; and,
concurrently pressing both the first end and the second end, and otherwise depressing a mid-position of the rocker key-button initiates a SEND command signal;
whereby the counter increment and decrement rocker key-button is duplexed to produce the SEND command signal enabling the encoded numerical value to be sent as a wireless channel-change command.

11. The television remote control of claim 1 comprising:
predetermining a timed interval of a number of seconds initiated by the manual actuation of one of the first key-button or the second key-button;
the sourcing of the clock signal at a SLOW clock rate during the timed interval; and,
maintaining the manual actuation and sourcing the clock signal at a FAST clock rate subsequent to the timed interval;
whereby change of the counter output values initially occur at a slow rate upon an initiation of the manual actuation and the count-state changes increase to a fast rate when the manual actuation is maintained beyond the timed interval.

12. A television remote control method comprising:
choosing a desired channel number;
initializing a counter and a numerical display to a default value;
sourcing a clock signal coupling with the counter;
submitting and maintaining a moderate press of an up-count key-button to enable incremental advancement of the counter output states;
displaying the counter output states as an incrementing numerical value;
releasing the manual actuation of the up-count key-button when the displayed numerical value matches the desired channel number;
whereby maintaining the manual actuation as a moderate press of the up-count key-button enables advance of the numerical display to the desired channel number.

13. The television remote control method of claim 12 comprising:
finding a substantial difference between the numerical display and the desired channel number;
increasing extent of the manual actuation as a firmer press of the up-count key-button to enable a more rapid incrementation of the counter output states;
whereby when the substantial difference between a displayed and a desired channel number is found the counter incrementation is sped-up to reduce wait-time until a match is obtained between the displayed number and the desired channel number.

14. The television remote control method of claim 12 comprising:
confirming the numerical display matches with the desired channel number;
manually actuating a SEND key-button entry;
sending a displayed numerical value represented by the numerical display to the televisor as an encoded wireless command signal;
whereby the advanced numerical display and the desired channel number are found to match and the displayed numerical value is sent as an encoded wireless command signal to the televisor to effect a change to the desired channel number.

15. The television remote control method of claim 12 comprising:
   recognizing the incrementing numerical value exceeds the desired channel number;
   submitting and maintaining an actuation of a down-count key-button to enable a decrementing of the counter output states;
   displaying the counter output states as a decreasing numerical value;
   releasing the actuation of the down-count key-button when the display of the decreased numerical value matches the desired channel number,
   whereby the displayed numerical value overstepping of the desired channel number is corrected by releasing the up-count key-button and initiating and maintaining actuation of a down-count key-button to decrement the numerical display to match the desired channel number.

16. The television remote control method of claim 15 comprising:
   manually actuating a rocker-style key-button with two operative ends aside from a neutral mid-position;
   manually pressing a first end equates with the up-count key-button for increasing the counter output values;
   manually pressing a second end equates with the down-count key-button for enabling the decrementing of the counter output values; and,
   concurrently pressing both the first end and the second end, and otherwise depressing a mid-position of the rocker key-button initiates a SEND command signal;
   whereby the counter increment and decrement rocker key-button is duplexed to produce the SEND command signal enabling the encoded numerical value representing the desired channel number to be sent as a wireless channel-change command.

17. A television remote control method comprising:
   predetermining a user's desired channel number;
   displaying a counter's clocked output state changes as an continuum of individual numerical values;
   manually enabling and maintaining a clocked up-count of the counter's output states;
   finding a match between a displayed one of the individual numerical values and the user's desired channel number;
   manually stopping the counter up-count when the match is found;
   whereby the counter up-count increases until the displayed numerical value matches the desired channel number and further count-up is stopped.

18. The television remote control method of claim 17 comprising:
   overshooting the match-up between the displayed numerical value and the desired channel number;
   manually enabling and maintaining a clocked down-counting of the counter's output states;
   finding a match between the displayed numerical value and the user's desired channel number;
   manually stopping the counter down-count when the match is found;
   whereby the counter down-count decreases until the displayed numerical value matches with the desired channel number and further count-down is stopped.

19. The television remote control method of claim 17 comprising:
   subsequently submitting a SEND command to issue the displayed numerical value as an encoded command signal;
   whereby the sent value is encoded as a wireless command signal for channel selection control of the televisor.

20. The television remote control method of claim 17 comprising:
   configurating a rocker switch having two uniquely operative ends to control the counter's output states;
   enabling the user to operate the rocker switch using at least one of the further steps of:
      i, pressing a first end of the rocker switch to effectuate the up-counting of the counter;
      ii, pressing a second end of the rocker switch to effectuate the down-counting of the counter;
      iii, pressing a mid-position situate between the first end and the second end of the rocker switch to effectuate submitting the SEND command when the displayed numerical value matches the user's desired channel number;
   whereby a single rocker switch may service more than one operative function.

* * * * *